United States Patent
Givens

(10) Patent No.: US 11,297,499 B2
(45) Date of Patent: Apr. 5, 2022

(54) ASSOCIATING VEHICLE USER EQUIPMENT WITH CUSTOMER MOBILE ACCOUNTS

(71) Applicant: AT&T Mobility II LLC, Atlanta, GA (US)

(72) Inventor: Andrew Givens, Atlanta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 16/943,350

(22) Filed: Jul. 30, 2020

(65) Prior Publication Data

US 2021/0168606 A1 Jun. 3, 2021

Related U.S. Application Data

(63) Continuation of application No. 16/699,923, filed on Dec. 2, 2019, now Pat. No. 10,764,751.

(51) Int. Cl.
*H04W 12/06* (2021.01)
*H04W 12/08* (2021.01)
(Continued)

(52) U.S. Cl.
CPC ............. *H04W 12/06* (2013.01); *H04L 63/08* (2013.01); *H04L 63/102* (2013.01);
(Continued)

(58) Field of Classification Search
CPC ....... H04W 12/06; H04W 12/08; H04W 4/24; H04W 4/40; H04W 4/50; H04W 12/00; H04W 4/21; H04W 4/23; H04W 4/30; H04W 4/48; H04W 4/46; H04W 4/44; H04W 4/80; H04W 4/70; H04W 4/60; H04W 88/00; H04W 88/02; H04W 88/08;
(Continued)

(56) References Cited

U.S. PATENT DOCUMENTS

2006/0116965 A1* 6/2006 Kudo et al. ...................... 705/52
2007/0067415 A1* 3/2007 Kawaguchi ................... 709/217
(Continued)

OTHER PUBLICATIONS

U.S. Appl. No. 16/699,923, filed Dec. 2, 2019.
Notice of Allowance received for U.S. Appl. No. 16/699,923 dated Apr. 30, 2020, 24 pages.

*Primary Examiner* — Meless N Zewdu
(74) *Attorney, Agent, or Firm* — Amin, Turocy & Watson, LLP

(57) ABSTRACT

A server device can, in response to a mobile device request, facilitate presentation of a login page via a mobile device. The login page can prompt for access credentials to a user account associated with mobile communications services and associated with a user identity, wherein a displayed link by an in-vehicle user equipment enabled the mobile device to request the login page. Based on a receipt of the access credentials from the mobile device, the server device can facilitate displaying a prompt, via the mobile device, for entry of an activation code, wherein the activation code was displayed by the in-vehicle user equipment along with the displayed link. The server device can receive a submitted code from the mobile device, and in response to the submitted code being determined to match the activation code, pairing the in-vehicle user equipment with the user account.

20 Claims, 15 Drawing Sheets

(51) Int. Cl.
*H04W 4/24* (2018.01)
*H04W 4/40* (2018.01)
*H04L 67/306* (2022.01)
*H04L 29/06* (2006.01)
*H04W 4/50* (2018.01)

(52) U.S. Cl.
CPC ............ *H04L 67/306* (2013.01); *H04W 4/24* (2013.01); *H04W 4/40* (2018.02); *H04W 4/50* (2018.02); *H04W 12/08* (2013.01)

(58) Field of Classification Search
CPC ......... H04W 8/00; H04W 8/005; H04W 8/08; H04W 8/14; H04W 8/18; H04W 8/183; H04W 8/24; H04W 8/22; H04W 8/245; H04W 8/26; H04W 8/265; H04W 4/02; H04W 12/002; H04W 12/04071; H04W 12/0608; H04W 28/0875; H04W 28/0883; H04W 28/0983; H04W 64/00; H04W 64/003; H04W 76/00; H04W 76/10; H04W 76/11; H04W 76/14; H04W 76/15; H04W 80/00; H04W 80/04; H04W 80/12; H04W 88/04; H04W 88/06; H04W 88/16; H04W 92/18; H04W 92/10; H04W 4/38; H04W 12/003; H04W 12/00305; H04W 8/04; H04L 29/06; H04L 29/08; H04L 29/06027; H04L 29/08009; H04L 29/08081; H04L 29/0809; H04L 29/08108; H04L 4/48; H04L 63/08; H04L 63/02; H04L 63/306; H04L 63/083; H04L 67/12; H04L 67/303; H04L 63/102; H04L 9/3073; H04L 29/06714; H04L 29/08306; H04M 1/6041; H04M 1/6091; H04M 15/705; H04M 15/715; H04M 15/72; H04M 15/00; H04M 7/0063; H04M 7/0066; H04M 1/6075; H04M 1/6083; G06F 3/062; G06F 3/0622; G06F 3/0623

See application file for complete search history.

(56) References Cited

U.S. PATENT DOCUMENTS

| | | |
|---|---|---|
| 2011/0112969 A1* | 5/2011 | Zaid et al. ................ 705/50 |
| 2013/0015947 A1* | 1/2013 | Best ........................ 340/5.7 |
| 2013/0179689 A1* | 7/2013 | Masumoto et al. ...... H04L 9/32 |
| 2014/0378063 A1* | 12/2014 | Nathwani et al. .... H04W 4/008 |
| 2016/0029243 A1* | 1/2016 | Seino ............... H04W 28/0215 |
| 2016/0037307 A1* | 2/2016 | Roth ................... H04W 4/046 |
| 2016/0044129 A1* | 2/2016 | Bergmann et al. .......................... H04L 67/2847 |
| 2016/0239903 A1* | 8/2016 | Othmer ............ G06Q 30/0635 |
| 2016/0309209 A1* | 10/2016 | Lieu et al. ......... H04N 21/2541 |
| 2016/0364100 A1* | 12/2016 | Nakasone ............. G06F 3/0483 |
| 2017/0118782 A1* | 4/2017 | Ho et al. ............. H04W 76/023 |
| 2018/0007521 A1* | 1/2018 | Meredith et al. ....... H04W 4/08 |
| 2018/0091930 A1 | 3/2018 | Jefferies |
| 2018/0146356 A1 | 5/2018 | Bai |
| 2018/0150880 A1* | 5/2018 | O'Driscoll et al. ......................... G06Q 30/0266 |
| 2018/0159935 A1* | 6/2018 | Cavalcanti et al. .... H04L 67/12 |
| 2018/0347531 A1* | 12/2018 | Tamane et al. ..... F02N 11/0807 |
| 2018/0357233 A1* | 12/2018 | Daze et al. ........ G06F 17/30029 |
| 2019/0222885 A1* | 7/2019 | Cho et al. ........ H04N 21/41422 |
| 2019/0258838 A1* | 8/2019 | Sweeney et al. .. G06K 7/10821 |
| 2019/0297472 A1 | 9/2019 | Prabhudeva |
| 2019/0356738 A1 | 11/2019 | Haidar et al. |
| 2019/0362344 A1 | 11/2019 | Koeppel et al. |
| 2019/0394513 A1* | 12/2019 | Shin et al. ....... H04N 21/41422 |
| 2020/0228933 A1* | 7/2020 | Prasad et al. ........... H04W 4/06 |

\* cited by examiner

ASSOCIATING VEHICLE USER EQUIPMENT WITH CUSTOMER MOBILE ACCOUNTS

RELATED APPLICATION

The subject patent application is a continuation of, and claims priority to, U.S. patent application Ser. No. 16/699,923, filed Dec. 2, 2019, and entitled "ASSOCIATING VEHICLE USER EQUIPMENT WITH CUSTOMER MOBILE ACCOUNTS," the entirety of which is hereby incorporated by reference herein.

TECHNICAL FIELD

The present application relates generally to the field of wireless communication and, more specifically, to the pairing of an in-vehicle user equipment to a user account, and operations that can be performed subsequent to the pairing.

BACKGROUND

Cellular communications technology, including radio access technology, has grown rapidly and evolved since the launch of analog cellular systems in the 1980s, starting from the First Generation (1G) in the 1980s, Second Generation (2G) in the 1990s, Third Generation (3G) in the 2000s, and Fourth Generation (4G) in the 2010s (including Long Term Evolution (LTE) and variants of LTE). Additionally, fifth generation (5G) access networks, which can also be referred to as New Radio (NR) access networks, are currently being developed and expected to fulfill the demand for exponentially increasing data traffic, and to handle a very wide range of use cases and requirements, including among others, mobile broadband (MBB) services, enhanced mobile broadband (eMBB) services, and machine type communications (e.g., involving Internet of Things (IOT) devices).

As part of the expansion of the cellular platform for new services, and to keep track with the increasing needs of the automotive industry, functionality of the cellular infrastructure is being developed to provide enhancements specifically for "vehicle-to-everything" (V2X) communications, which can comprise, for example, vehicle-to-vehicle (V2V), vehicle-to-infrastructure (V2I), vehicle-to-network, (V2N) and vehicle-to-pedestrian (V2P) communications. This development of the cellular infrastructure, functionality, and protocols (e.g., standards) for V2X communications is often referred to as cellular vehicle-to-everything (V2X) communications, or C-V2X communications. C-V2X communications leveraging cellular network infrastructure can provide reliable, actionable information flows with high definition quality services while paving the way for connected and autonomous driving into the near future. The collaboration between automotive and wireless telecommunications technologies is driving the next generation of autonomous vehicular designs. Evolutions in mobile network infrastructure will continue to further drive the C-V2X standardization efforts to meet the increasing needs of the automotive sector with new use cases. The development and commercialization of C-V2X technology involves multiple stake holders, including carriers, technology providers, automobile original equipment manufacturers (OEMs), and infrastructure vendors (to identify some stakeholders), all working together to implement and showcase the benefits and efficiency in the use of this technology for advanced vehicular connectivity and intelligent communications.

As more user equipment embedded in vehicles (e.g., automobiles, automotive vehicles, etc.) are connected to mobile networks, information and multimedia content can be distributed via this network, so that more user equipment can access in-vehicle entertainment-related services.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
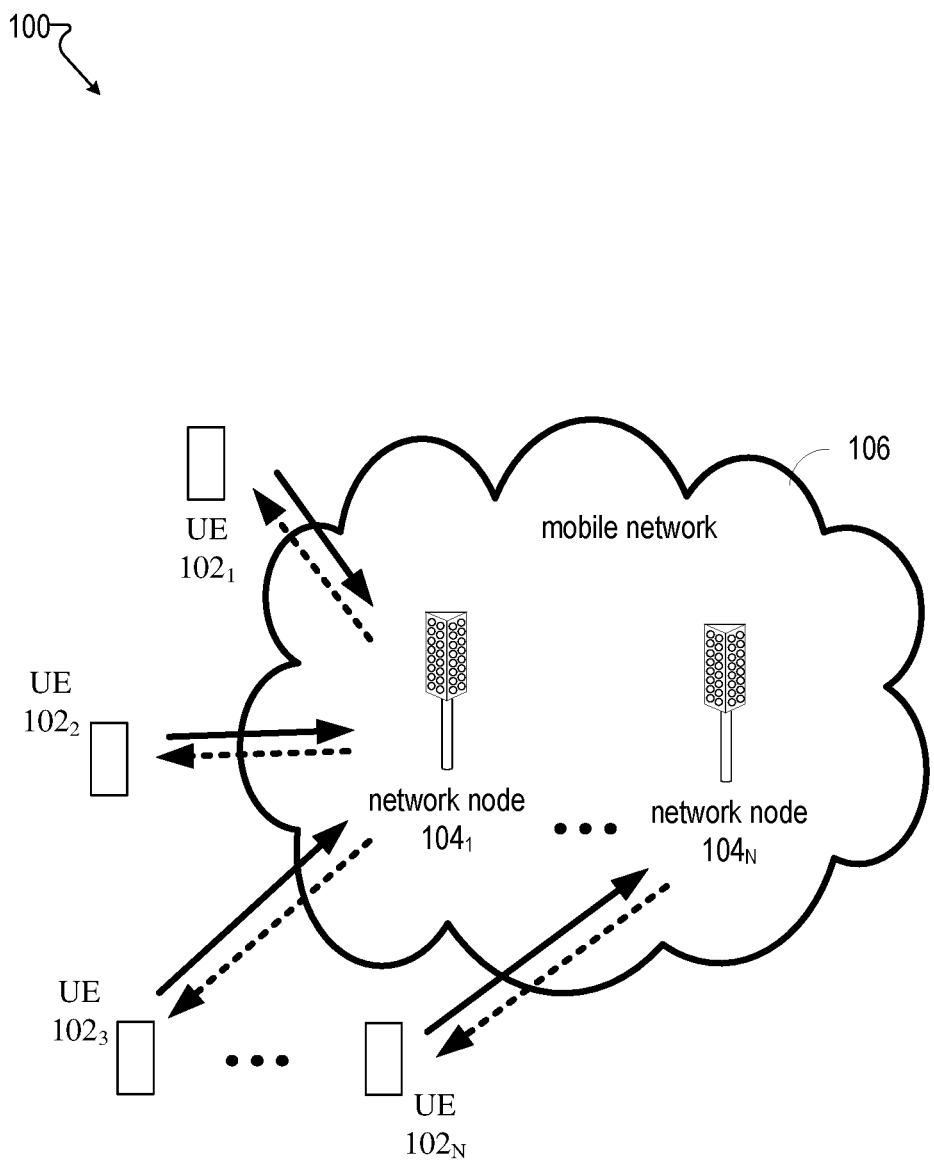
FIG. 1 illustrates an example mobile communications network (e.g., mobile communication system, mobile network, wireless network, cellular network, etc.) having a network node device (also referred to herein as a network node) and user equipment (UE), in accordance with various aspects and example embodiments of the present application.

The present application is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the present application. It may be evident, however, that the present application can be practiced without these specific details. In other instances, structures and devices are shown in block diagram form to facilitate describing example embodiments.

The methods and operations (e.g., methods, processes, and logic flows) described in this specification can be performed by devices (e.g., user account administration server 210, content application server 230, etc.) comprising programmable processors that execute machine executable instructions (e.g., computer program product, computer-readable instructions, software, software programs, software applications, software modules, etc.) to facilitate performance of the operations described herein. Examples of such devices can be devices comprising circuitry and components as described in FIG. 15.

As more user equipment embedded in vehicles (in-vehicle UEs) are connected to mobile networks, information and multimedia content can be distributed via the mobile networks, so that more user equipment can access in-vehicle entertainment-related services (in-vehicle infotainment). As more and more data intensive applications and platforms are integrated with the in-vehicle infotainment platform, enhancements to the in-vehicle experience strive to allow user identities (e.g., customers, users) to subscribe to a retail data plan via head unit. While in a vehicle, subscribing to an in-vehicle infotainment and mobile communications plan offered by a mobile network operator can be cumbersome and counter-intuitive. The consumer needs a simple and effective way to sign up for this service.

The present application relates to activation of in-vehicle UEs, wherein the in-vehicle UEs (either in the head unit or in the original equipment manufacturer's native application) are operable to receive communications via a mobile network. Example embodiments as described herein provide a simpler and more effective way to pair a customer's in-vehicle UE with the customer's mobile communications account, sign up for in-vehicle infotainment services, and receive more targeted (or customized) content.

In example embodiments, once activated the in-vehicle UE is paired with a user's account, wherein the user account can be used to access communications services (mobile, wireless, or cellular communications service), and also a content delivery service facilitated by a content delivery system. In example embodiments, after activation and pairing, vehicle model information, global positioning system (GPS) data, and user behavior data (e.g., preference data) can be used to determine the selectable images (e.g., icons, thumbnails, images, etc.) associated with content that might be presented to the user.

FIG. 1 illustrates some example components of a typical wireless communication system 100 (also referred to as wireless system 100, mobile system 100, mobile communications system 100). In example embodiments (also referred to as non-limiting embodiments), wireless communications system 100 can comprise a mobile (also referred to as cellular) network 106, which can comprise one or more mobile networks typically operated by communication service providers, also referred to as herein as mobile network operators (or mobile operators). The wireless communication system 100 can also comprise one or more user equipment (UE) $102_{1-N}$ (also referred to as UE 102 in the singular). UE $102_{1-N}$ can communicate with one another via one or more network node devices (also referred to as network nodes) $104_{1-N}$ (referred to as network node 104 in the singular) of the mobile network 106. The dashed arrow lines from the network nodes $104_{1-N}$ to the UE $102_{1-N}$ represent downlink (DL) communications and the solid arrow lines from the UE $102_{1-N}$ to the network nodes $101_{1-N}$ represent uplink (UL) communications.

UE 102 can comprise, for example, any type of user equipment that can communicate with mobile network 106, as well as other networks (see below). The UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a machine-type communication (MTC) device, and the like. UE 102 can also comprise IOT devices that communicate wirelessly.

Figure 2:
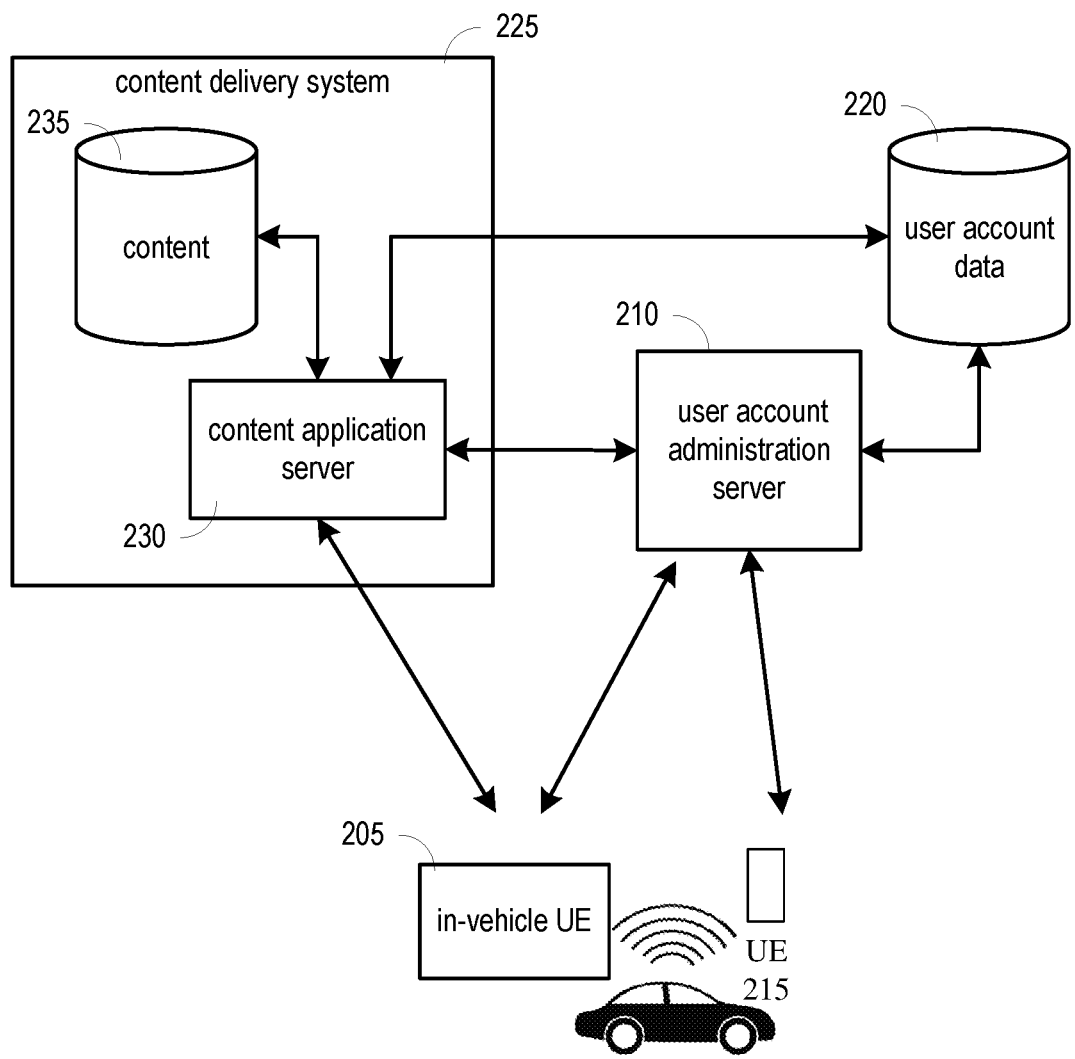
FIG. 2 illustrates an example system having components related to the pairing of an in-vehicle UE (e.g., vehicle UE, vehicle-embedded UE, etc.) and a user account (e.g., customer account associated with the provision of mobile communication services by a mobile network operator), in accordance with various aspects and example embodiments of the present application.
Figure 14:
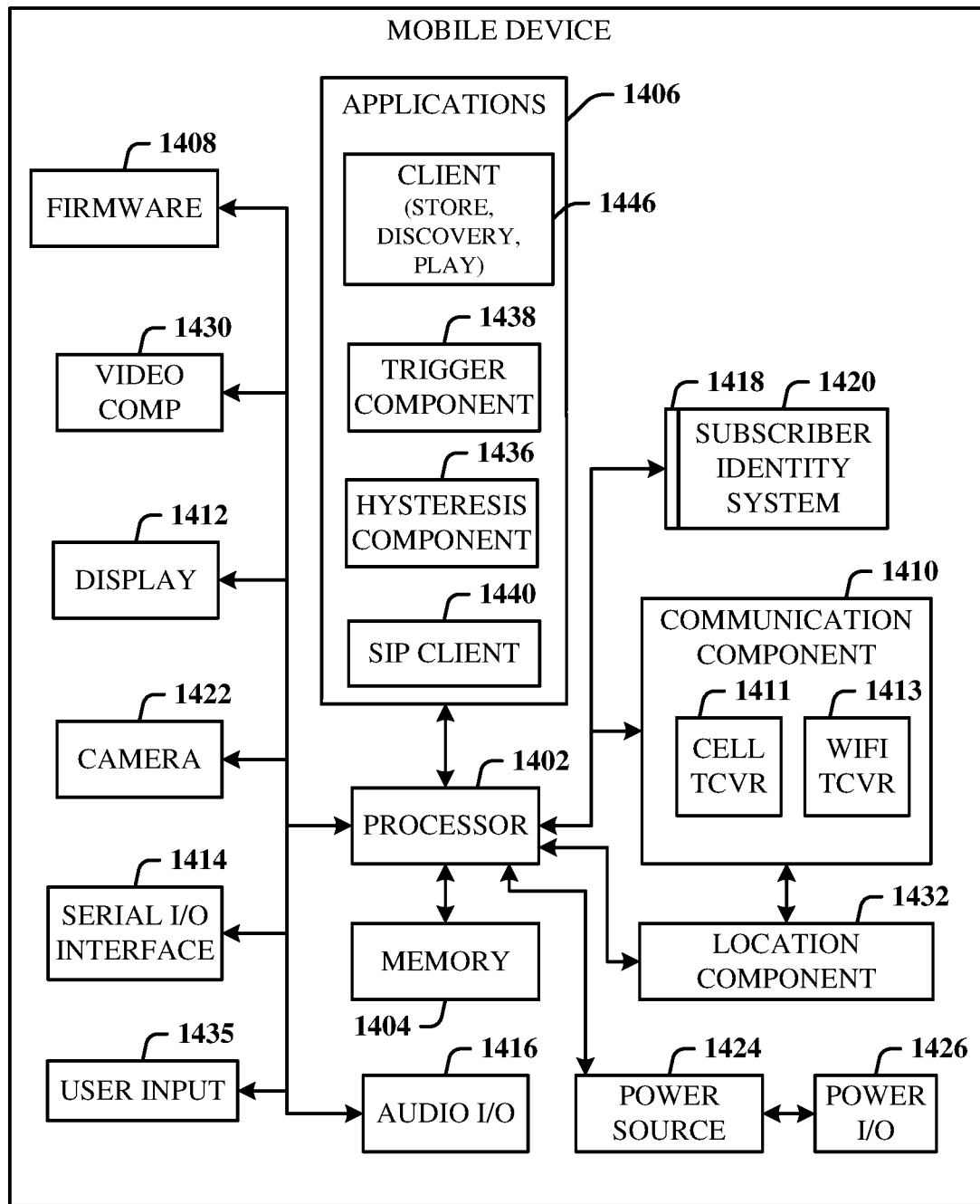
FIG. 14 illustrates an example block diagram of a mobile device that can execute processes and methods, in accordance with various aspects and embodiments of the present application.

In example embodiments of the present application, the UE 102 can be a C-V2X wireless device within a vehicle (e.g., C-V2X UE enabling C-V2X communications), referred to herein as an in-vehicle UE (e.g., in-vehicle UE 205 of FIG. 2). Or, the vehicle itself can be said to be a C-V2X UE. In example embodiments of the present application, as will be described below, a C-V2X UE can comprise software and hardware, some components of which can be similar to those in a mobile device (e.g., mobile device 1400 as shown in FIG. 14). The in-vehicle UE can be a user equipment located in a vehicle, which can be embedded in a vehicle. In example embodiments, the in-vehicle UE can be integrated with a vehicle's head unit, which can be a UE located at or near the dashboard of a vehicle. The head unit can comprise a display for displaying information visible to a user (e.g., passenger, driver, etc.). In example embodiments, the in-vehicle UE can also be operable to transmit a signal to one or more other displays located in the vehicle (e.g., a display located on the back of a headrest of a seat in the vehicle, or a display that extends from the ceiling of the vehicle), facilitating display of, for example, content that comprises movies and other entertainment programs.

Mobile network 106 can comprise various types of networks implementing various transmission protocols, including but not limited to cellular networks, femto networks, picocell networks, microcell networks, internet protocol (IP) networks, Wi-Fi networks associated with the mobile network (e.g., a Wi-Fi "hotspot" implemented by a mobile handset), and the like. For example, in at least one implementation, wireless communications system 100 can be or can include a large-scale wireless communication network that spans various geographic areas, and comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for 5G New Radio (NR) systems, the embodiments can be applicable to any radio access technology (RAT) or multi-RAT system where the UE operates using multiple carriers. For example, wireless communications system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (WiMax), and the like.

In example embodiments, the mobile network 106 can operate according to the cellular-to-vehicle everything (C-V2X) standard. In a typical C-V2X delivery network, a mobility network can be operable to deliver file downloads and deliver live streaming from a content source (e.g., content server connected to a content store) to a large number of C-V2X UEs targeted in specific regions (e.g., UEs $102_{1-N}$, wherein a UE 102 can be enabled to communicate according to C-V2X standards.

Still referring to FIG. 1, in example embodiments, UE 102 can be communicatively coupled (or in other words, connected) to a network node 104 of the mobile network 106. Network node 104 can have a cabinet and other protected enclosures, an antenna mast, and multiple antennas for performing various transmission operations (e.g., MIMO operations). Each network node 104 can serve several cells, also called sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an eNode B device (e.g., evolved NodeB), a network controller, a radio network controller (RNC), a base station controller (BSC), a relay device, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the network node is referred to by some as a gNodeB (gNB) device, which provides new radio (NR) user plane and control plane protocol terminations towards the UE, and connects to the 5G core.

Moving to FIG. 2, in accordance with example embodiments of the present application, a system and operations for activating an in-vehicle UE, which pairs the in-vehicle UE with a user account, and delivering content to the in-vehicle UE, is provided. The system can comprise an in-vehicle UE 205, which can be as described above. The system can also comprise a user account administration server 210, which can comprise one or more servers that execute software modules (as described above) that can facilitate various functions, methods, and processes. In example embodiments, modules comprising executable instructions that, when executed by a processor of the user account administration server 210, facilitate performance of operations, can be stored on a memory device of the user account administration server 210 (or a memory device connected to the server). The user account administration server 210 can also be operable to send executable code capable of generating graphical user interfaces (GUIs), such as webpages, via a user equipment that a user identity can interact with (e.g., using a UE 215, which can be any of the type of devices described above with respect to UE $102_{1-N}$, for example, a mobile handset, smartphone, etc.). In example embodiments, a user device (e.g., UE 215) can view information from, and submit information to the user account administration server 210.

In example embodiments, the user account administration server 210 can be connected to a user account data store 220, which can enable the user account administration server 210 to access user account data. The user account data can be related to the provision of mobile communications services and infotainment services to the in-vehicle UE 205 via a mobile network (e.g., mobile network 106).

The user account administration server 210 can also be operable to send information to a content delivery system 225. The content delivery system can comprise a content application server 230, which in example embodiments, can comprise one or more servers that execute software modules (as described above) that can facilitate various functions, methods, and processes. In example embodiments, modules comprising executable instructions that, when executed by a processor of the content application server 230 facilitate performance of operations, can be stored on a memory device of the content application server 230 (or a memory device connected to the server). The content application server 230 can also be operable to send executable code capable of generating graphical user interfaces (GUIs) that a user identity can interact with (e.g., interact with using in-vehicle UE 205).

The content application server 230 can be connected to a content store (e.g., content store 235), which can comprise various multimedia files corresponding to selectable images (e.g., thumbnails that can be displayed and selected by a user) representative of content such as music, films, movies, TV shows, and other program files. The content store can also contain the selectable images. The content application server 230 can be operable to transmit the selectable images for display by the in-vehicle UE 205, and in response to a user selecting a selectable image (e.g., via a touch screen display), the content application server 230 can be operable to deliver, via a mobile network, the content associated with that selectable image.

Figure 3:
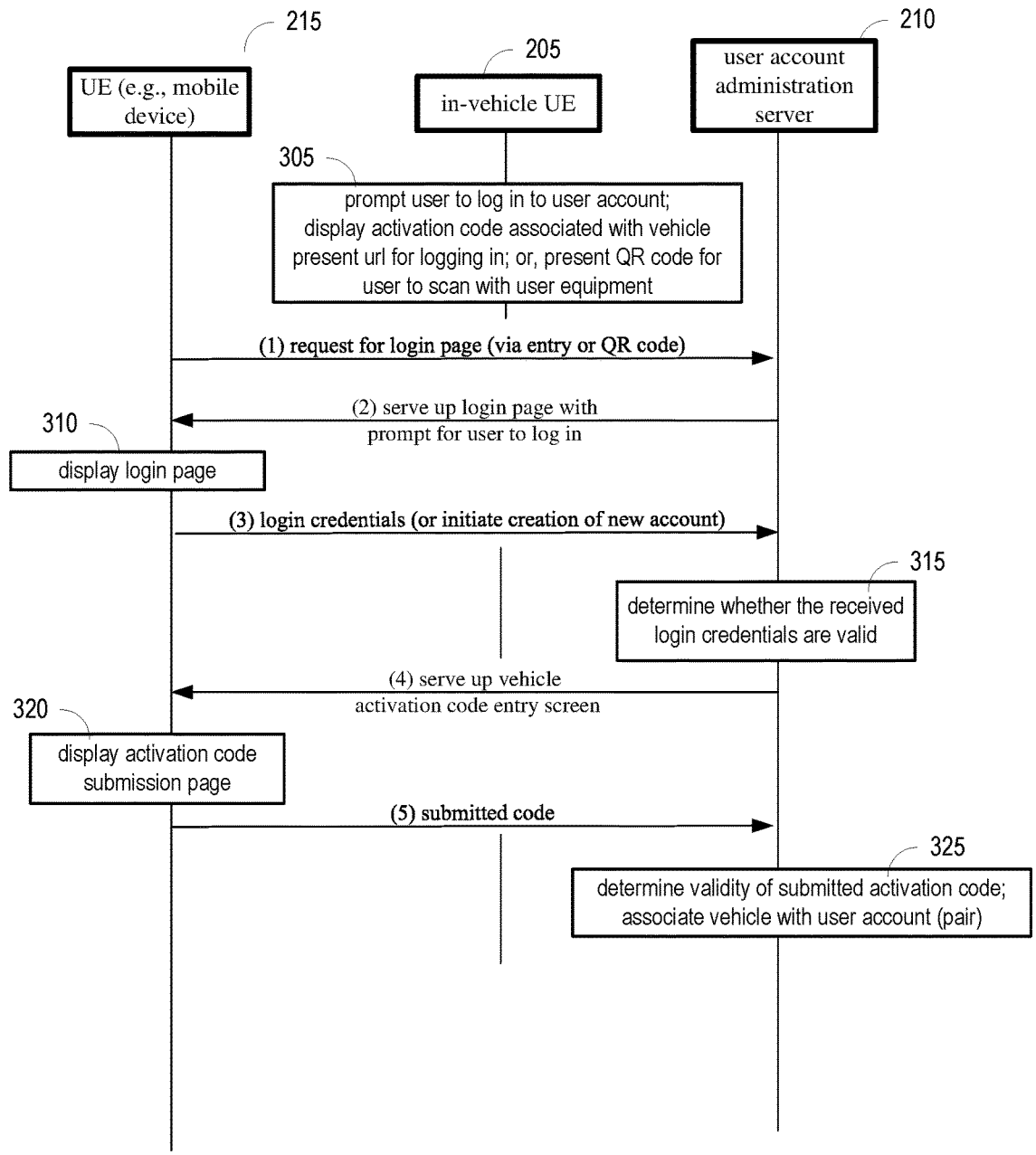
FIG. 3 illustrates a transaction diagram related to pairing of an in-vehicle UE and a user account, in accordance with various aspects and example embodiments of the present application.

FIG. 3 describes a transaction diagram describing a process that utilizes an authorization flow that can allow a user identity to, using the user identity's mobile device (e.g., UE 215), authorize the in-vehicle UE (e.g., in-vehicle UE 205) to access the user's user account, wherein the user account relates to the provision of mobile communications and infotainment services, both of which can be provided by a mobile network operator. In example embodiments, at stage 305, on initial setup of the in-vehicle UE, for example, the in-vehicle UE can present the user with one or more screens on a user interface (which can be a graphical user interface (GUI) that can prompt the user to log in to his or her user account. In example embodiments, the screen can also be presented at a later time after initial setup of the in-vehicle UE. The screen can also display information informing the user of the benefits of having a service plan. The in-vehicle UE can be operable to display a link that enables a user, using the mobile device, to request a login page. The login page is associated with an activation of in-vehicle UEs, wherein the activation results in a pairing of the in-vehicle user equipment with the user account. The link can comprise, for example, a webpage universal resource locator (e.g., URL), for example www.myvehicle.mno.com/activate. The link can also comprise a QR code (or some other coded pattern, such as a bar code) for a user to scan with his or her mobile device (e.g., the mobile device can have a QR code scanner application). Additionally, the in-vehicle UE can display an activation code associated with the in-vehicle UE. To pair the in-vehicle UE and the user account, the user can visit the activation page, by entering the URL on a browser, or can just scan the QR code with a QR code reader application (e.g., an application running on the user identity's UE). Either can take the user to screens that can be used to log in to the user account (or, in some example embodiments, on the login page, create a user account if one does not exist). Example embodiments of a screen (e.g., GUI) that can be displayed at stage 305 is shown below in FIG. 6.

At transaction (1) of FIG. 3, the mobile device can transmit a request for the login page. The request can be sent when the user, using the mobile device, scans the QR code (or alternatively, type in the URL into a web browser on the mobile device) presented by the in-vehicle UE at stage 305.

Figure 7:
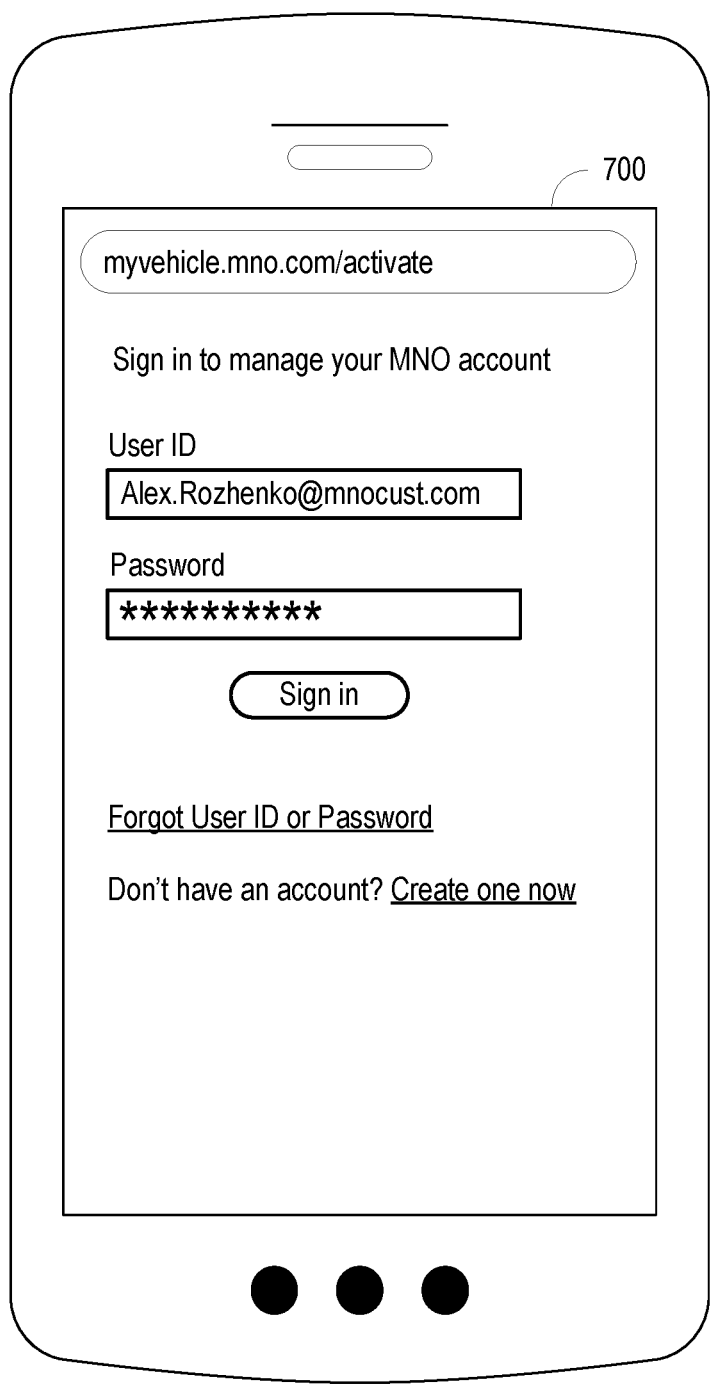
FIG. 7 illustrates an account login GUI for logging in to a user account, in accordance with various aspects and example embodiments of the present application.

At transaction (2), in response to the request from the mobile device for a login page, the user account administration server (e.g., user account administration serve 210) can transmit (e.g., "serve up") a login page to the mobile device for display via a GUI (e.g., web browser) that runs on the mobile device. At stage 310, the mobile device can, after receiving the login page from the user account administration server, facilitate display of the login page. The login page can display prompts to solicit entry of access credentials related to the user account associated with the user identity (or present a link that results in the display of an account creation page). As mentioned above, this particular login page is associated with an activation of an in-vehicle user equipment, wherein the activation results in a pairing of the in-vehicle user equipment with the user account. Whereas other login pages can, for example, allow the user to view or make changes to their account, successfully logging in (or subsequent to the creation of an account) from the login page presented at stage 310 can result in presentation of a screen (e.g., GUI) that allows a user to enter an activation code, resulting in the pairing of the in-vehicle UE with the user account. An example of the login page is shown in FIG. 7 below. In alternative example embodiments, the user account administration server can, instead of transmitting a login page, transmit an option page to be displayed on the browser of the mobile device (e.g., "serve up" the option page). From the option page, the user can be presented with choices to sign in (e.g., log in) to his or her user account with the proper credentials, or create a new account; the user identity can select a displayed hyperlink that will result in the presentation of a login page that prompts the user to log in with the user's access credentials, or the user can select a hyperlink that results in the presentation of an account creation page where the user can establish a new user account.

At transaction (3), upon entry of login information by a user identity, the mobile device can transmit the login credentials (or new account creation credentials) to the user account administration server.

At stage 315 shown in FIG. 3, the user account administration server, after receiving the login credentials submitted by the mobile device, can determine whether the received login credentials are valid (e.g., match the actual login credentials, are authenticated, etc.).

Figure 8:
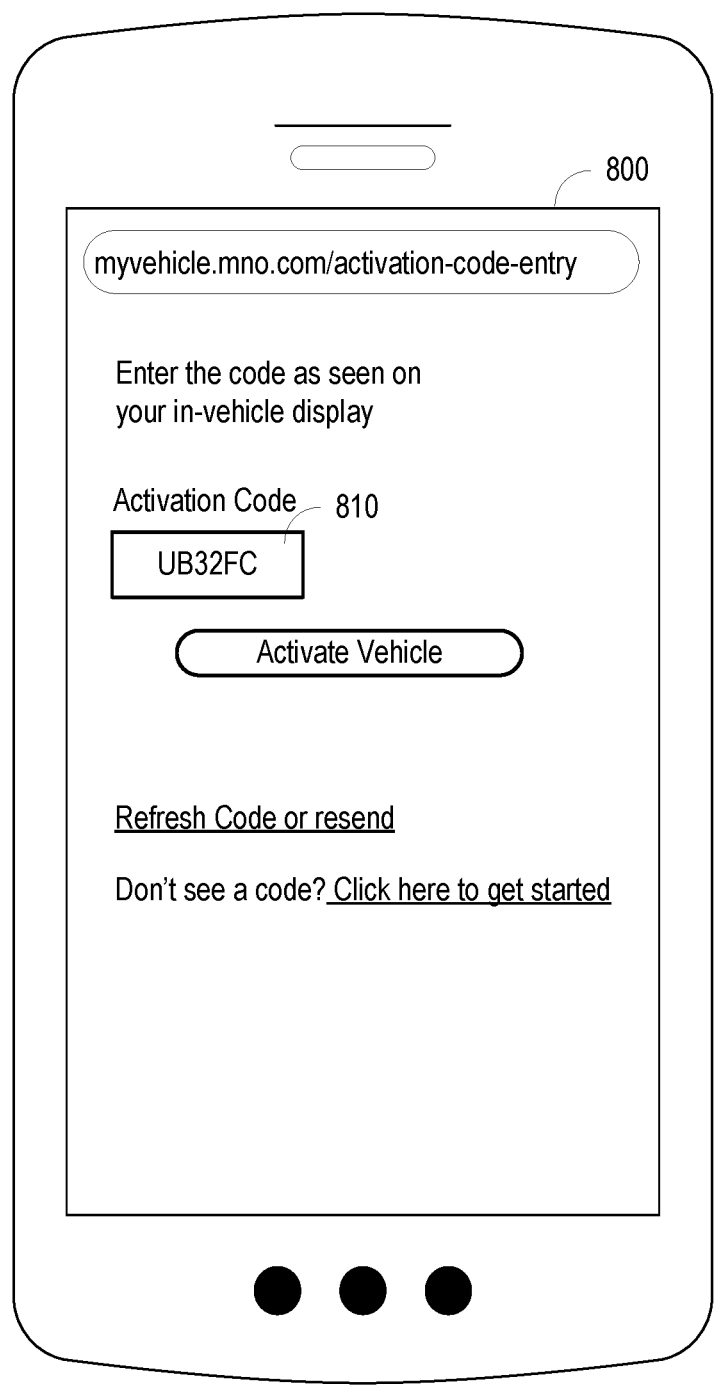
FIG. 8 illustrates an activation code entry GUI for entry of an activation code, in accordance with various aspects and example embodiments of the present application.

At transaction (4), based on the receipt of valid access credentials from the mobile device, the user account administration server can facilitate display of a prompt via the mobile device for entry of an activation code. In example embodiments, what is being sought for entry by the user identity is the activation code that was displayed by the in-vehicle user equipment at stage 305, as described above with respect to FIG. 8. In example embodiments, the server device can serve up a webpage (e.g., transmit the page to the mobile device) comprising a prompt for the activation code, wherein a user can enter in alphanumeric characters into a field. At stage 320, the activation code submission webpage can be displayed on the browser of the mobile device. FIG. 8 below shows an example embodiment of such a screen (e.g., GUI).

At transaction (5) of FIG. 3, the mobile device can transmit the submitted code to the user account administration server.

At stage 325, the user account administration server, after receiving the submitted code, can be operable to determine whether the submitted code matches with the activation code, which, in example embodiments, can be obtained from the in-vehicle UE (e.g., the in-vehicle UE transmitted its activation code to the user account administration server at some point, for example, during stage 305). In response to the determination that the submitted code is valid (e.g., matches the activation code presented by the in-vehicle UE), the user account administration server facilitates pairing of the in-vehicle UE with the user's account. For example, the user account administration server can associate data corresponding to the in-vehicle UE with the user account, and store this information on the user account data store (e.g., user account data store 220).

Figure 9:
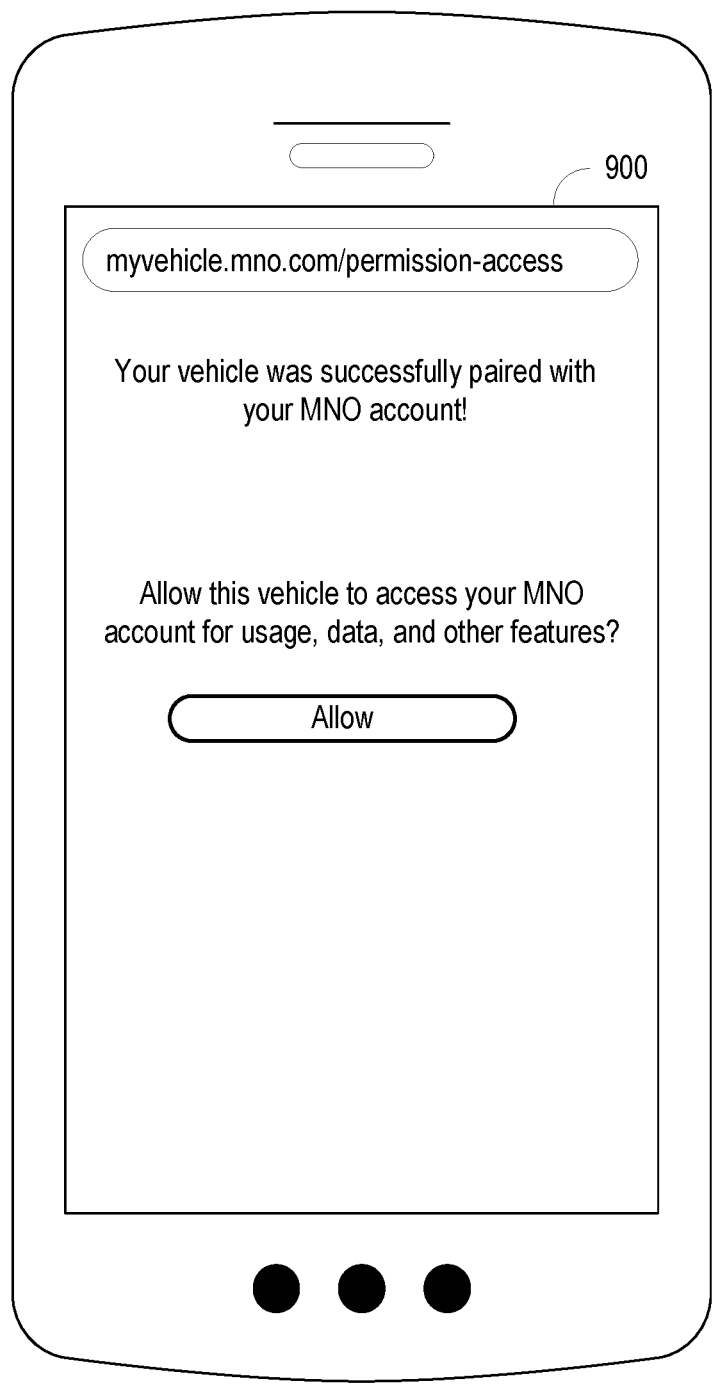
FIG. 9 illustrates a confirmation GUI for confirmation of access, in accordance with various aspects and example embodiments of the present application.

In example embodiments, the account administration server can facilitate display on the mobile device of an indication that the vehicle has been successfully paired with the user's user account. In example embodiments, an option can be presented to the user that asks the user whether the user will allow the in-vehicle UE access to the user's account for usage, data, and other account features. Example embodiments of such a confirmation screen is shown in FIG. 9. After a user has selected an indication to allow the in-vehicle UE access, a confirmation screen can be displayed by the mobile device to indicate a successful pairing. The user account is now associated with data elements that identify the in-vehicle UE.

Figure 10:
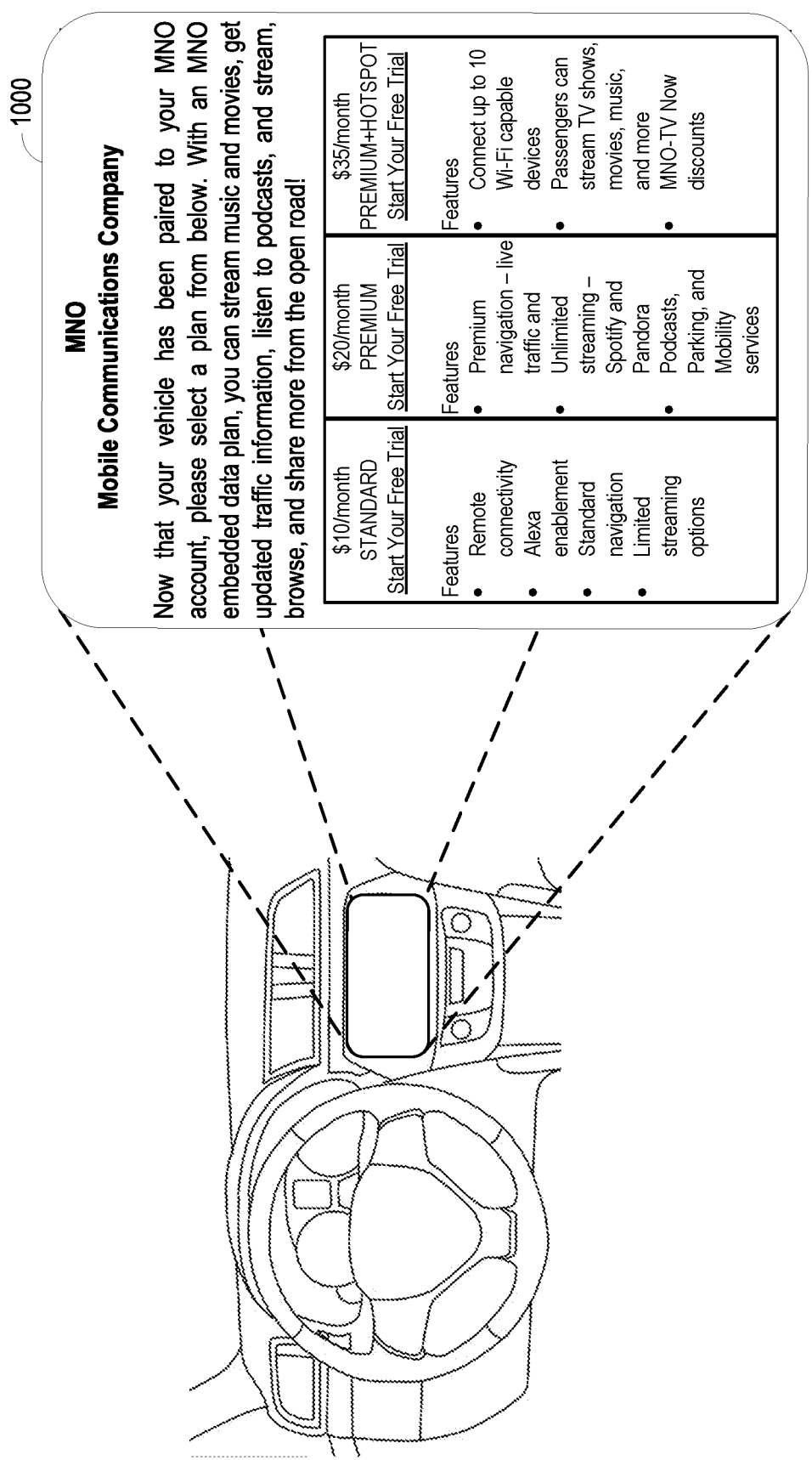
FIG. 10 illustrates a plan selection GUI for presenting mobile services plans, in accordance with various aspects and example embodiments of the present application.

Once the user account has been paired to the platform, mobile communications and infotainment plans can be presented by the in-vehicle UE to the end users, and in example embodiments, a free trial could be started at a specific tier. The plans can be post-paid plans but can also be pre-paid plans. As such, subsequent to the pairing, the user account administration device can facilitate presenting a plan via the in-vehicle user equipment for selection of communication options for delivery of the mobile communications to the in-vehicle user equipment, and facilitate association of the in-vehicle user equipment with entertainment related services deliverable by the content application server (e.g., content application server 230). In example embodiments, the options can be transmitted by the content application server to the in-vehicle UE for display to the user, and further, selections of a plan by the user can be received by the user account administration server, and associated with the user's account and stored in a database (e.g., at user account data store 220). An example GUI from which users can select their plan is shown in FIG. 10. Additionally, in-vehicle mobile communications and infotainment services can now be charged to the user via the user account and can be delivered to the in-vehicle UE. The in-vehicle UE can request content from the content application server, which can be authorized, by the user account administration server, to deliver content, based on the user's selected plan.

In example embodiments, the pairing of the in-vehicle UE with the user account, and also access to content served up by the content application server, can be performed using, for example, the OAuth 2.0 standard.

In example embodiments, the in-vehicle UE, subsequent to pairing and selection of a communications plan and entertainment package by the user identity, can display a series of selectable images (e.g., thumbnails), wherein each thumbnail can represent content that can be streamed to the in-vehicle UE. The thumbnails can be displayed based on, for example, category (e.g., music videos, comedy, action, science fiction, foreign language, etc.). In response to a user identity selecting the selectable image (e.g., by using a finger or stylus), the in-vehicle UE can be operable to send a request for the content related to the selectable image that was selected by the user. In response to the request, the content application server can be operable to send (e.g., stream) the content to the in-vehicle UE. The in-vehicle UE can display the content via a display (e.g., play a movie) coupled to the in-vehicle UE (e.g., locally connected to the in-vehicle UE, connected via hard-wired, or connected wirelessly, e.g., via Bluetooth, etc.), or in the case of music or audio, facilitate generation of music, words, and sound.

Figure 4:
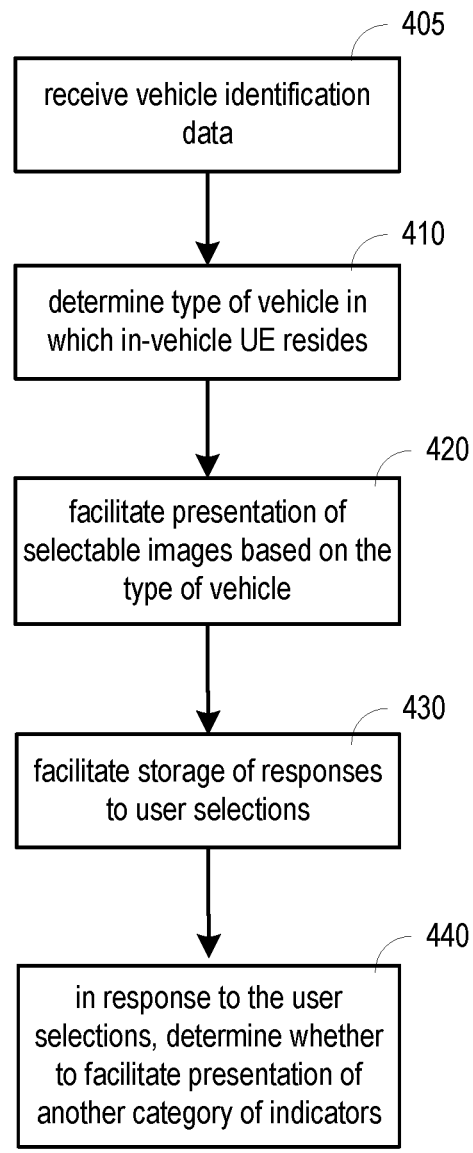
FIG. 4 illustrates a flow chart depicting an example of operations that can be performed by a content application server, in accordance with various aspects and example embodiments of the present application.

FIG. 4 illustrates a flow diagram depicting a process that can be performed by a content application server (e.g., content application server 230). In example embodiments, after the in-vehicle UE (e.g., in-vehicle UE 205) has been paired to the user's account, and after authorization has been granted to allow the in-vehicle UE (and the vehicle content system) to access the user account for usage, preference data, and other account features, the in-vehicle UE can transmit vehicle identification data, which can comprise the make and model of the vehicle in which the in-vehicle UE is disposed (e.g., embedded, located, resides, situated). The vehicle identification data can be received by, for example, the user administration account server (e.g., user account administration server 210). The user administration account server can, in example embodiments, transmit or forward the vehicle identification information to the content application server (e.g., content application server 230).

At block 405, the content application server can receive the vehicle identification data. In example implementations, the vehicle identification data can be stored in the user data account repository, or it can be stored in a database associated with the content application server, or both (and can be synced up). In example embodiments, at block 410, the make and model of the vehicle can be used, e.g., by the content application server, to determine the type of vehicle (e g , mini-van, coupe, sedan, 18-wheeler, etc.) in which the in-vehicle UE is embedded. Based on the type of the vehicle in which the in-vehicle UE resides, the content application server can, at block 420, facilitate delivery of selectable images (e.g., icons, thumbnails, images) to be displayed via a display of the in-vehicle user equipment, wherein the selectable images represent content streamable to the in-vehicle user equipment via the mobile communications network. The vehicle identification data can be used to determine, for example, that the vehicle is of a type that is typically used to transport children (e.g., minors), such as a minivan. The in-vehicle entertainment server can be operable to present selectable images associated with content that would be likely to enjoyed by minors, or marketed to minors (e.g., age-appropriate). A default for this type of vehicle can be, for example, selectable images associated with a motion picture association G-rating (e.g., for general audiences), or other content classified as for family or children. Upon use of the in-vehicle UE, the selectable images can be transmitted to the in-vehicle UE for display. In example embodiments, in response to a determination that the type of vehicle is a minivan, the selectable images associated with a G-rating can be presented first, and then icons related to another category of films can be presented secondarily (e.g., below the first icons, which can be accessed by scrolling, or on a second page). As such, as an example, a parent can turn on the in-vehicle UE. The UE can present a menu of services displayed to the user (e.g., weather information, GPS, music, and movies). If the user of a vehicle determined to be a minivan, for example, selects "movies," the vehicle UE can display select icons associated with a G-rating first (e.g., latest releases of G-rated movies). The user can either select content associated with the first group of selectable images (e.g., G-rated), or the user can scroll (or advance to another screen) to see a second group of selectable images (e.g., PG-related). Over time, data collected by the in-vehicle entertainment system, and associated with the user's account, can be used to inform as to which set of icons to display. If, for example, user data indicates that each time G-rated programs were presented that the user scrolled past them in favor of PG-related programs, the selectable images related to PG-related programs can be presented to be featured more prominently (e.g., at the top of the list, or on the first page) when the in-vehicle entertainment services are subsequently accessed. In example embodiments, the responses to the selection of the images can be transmitted to the content application server as preference data.

The content application server can then, at block 430, facilitate storage of preference data related to the selections. The content application server can transmit the preference data to the user account administration server, which can then associate the preference data with the user account, and store it in a repository (e.g., user account data store 220). Based on the preference data, which can be updated periodically, subsequent selectable images determined after analysis of the preference data (e.g., stage 440). Of note, in other example embodiments, because the in-vehicle UE has been authenticated to receive content from the content application server according to a service plan, instead of (or in addition to) the user account data repository, the user preference data can be stored in a repository associated with the content application server, along with other user and in-vehicle UE information. The information stored in this repository can be synced with the information stored in the user data account repository.

Figure 5:
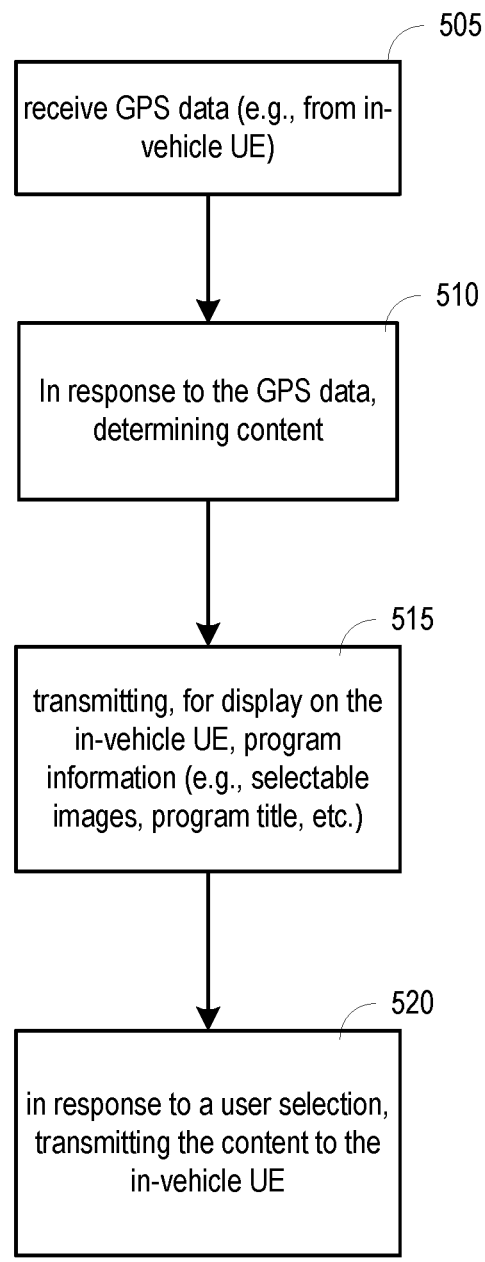
FIG. 5 illustrates a flow chart depicting another example of operations that can be performed by a content application server, in accordance with various aspects and example embodiments of the present application.

Now referring to FIG. 5, FIG. 5 is a flow chart showing example embodiments of a process for delivering content based on global positioning system (GPS) data. The GPS data can be transmitted by a GPS device, for example the non-paired in-vehicle UE (e.g., in-vehicle UE 205) that is equipped with a GPS component, and GPS application. In example embodiments, the GPS data can be received by, for example, the user account administration server (e.g., user account administration server 210), which can forward the GPS data to the content application server (e.g., content application server 230). In example implementations, the GPS data can also be sent directly by the in-vehicle UE to the content application server. At block 505, the content application server can receive the GPS data.

In example embodiments, the received global positioning system data can comprise trip duration data, which can be derived by the GPS based on a starting point and destination point. At block 510, based on the duration, the content application server can determine content. At block 515, the content application server can transmit, for display via the in-vehicle UE, program information (e.g., selectable images such as a selectable thumbnail, program titles, etc.) related to the determined content. At block 520, in response to a user selection of the program information (e.g., selecting a selectable image), the content application server can retrieve the content related to that selectable image. The content can be retrieved from a content store (e.g., content store 235) associated with the content application server, and then transmitted by the content application server to the in-vehicle UE, which can then display or play the content.

Still on FIG. 5, as an example, a user can use the GPS device of the in-vehicle UE (or another GPS device, which can be coupled to the in-vehicle UE, or associated with the user account) to enter a destination. The GPS device can be comprised of hardware and software (e.g., a GPS software application). The destination entered into the GPS by the user identity might be, for example, Helen, Ga., and the starting point might be Atlanta, Ga. Based on this route, the duration calculated by the GPS device might be one hour and thirty-seven minutes. In example embodiments, the content application server, in response to receiving this GPS data (e.g., via the in-vehicle UE), can, for example, determine content viewable within the duration (e.g., movies, TV programs, etc., that have a duration under one hour and thirty-seven minutes). In example embodiments, the content application server can consider a buffer time allotted to account for breaks from viewing the content (e.g., a program might be one hour long, but the content application server can determine that an hour and five minutes is required for the content to be viewed, to account for breaks). Once determined, the content application server can transmit program information (e.g., program title, thumbnails, etc.) associated with the selected content to be displayed via the in-vehicle UE. The in-vehicle UE can then display the selectable images to the user. In response to a selection of one of the images by the user (e.g., using his or her finger), the in-vehicle UE can transmit the user selection to the content application server. The content application server, in response, can stream the content corresponding to the user's selection. Thus, the content selected can be based on the remaining amount of travel time to the destination. If the remaining time on the destination is, for example, only an hour, then the vehicle content system can be operable to facilitate display of selectable images corresponding to programs that are no longer than an hour in length.

Still referring to FIG. 5, in other example embodiments, the GPS data might indicate that a destination is outside of a particular geographic area. The content application server can receive global positioning system data indicating a destination of the vehicle. The content application server can then determine content based on the destination, and then deliver program information related to that content (e.g., program title, selectable images). The content can be determined based on, for example, the destination being outside of a geographic area. In example embodiments, the content application server can calculate the duration of the trip based on the origin and destination entered into the GPS, and determine content that can be viewed within that duration. For example, the content application server can, in response to a determination that the GPS data received from the vehicle UE indicates that a trip is planned (for example, if a destination is indicated outside of a certain geographical area, such as outside a 200 mile radius from the city of residence of the user), determine content suitable for the trip. The content application server can transmit the program information (e.g., program title, selectable images, thumbnails, etc.) to the in-vehicle UE. The in-vehicle UE can display to the user the selectable images for content that can be selected for the trip. The vehicle content system can be operable to facilitate, for example, display of a message by the vehicle UE that reads, "It looks like you are going on a trip. Here are some suggested programs for your journey." The vehicle content system can then facilitate display by the vehicle UE a list of selectable images related to movies that can be selected for the journey.

Still referring to FIG. 5, in example embodiments, the content determined by the content application server can be content that is related to the destination that has been input into the GPS (e.g., if the destination is New York City, the selectable images can be related to, for example, movies or documentaries featuring landmarks in New York City).

FIGS. 6-10 depict example embodiments of screens (e.g., via GUIs) that can be displayed that facilitate pairing of the in-vehicle UE with the user account, and selection of mobile communications and infotainment plans.

Figure 6:
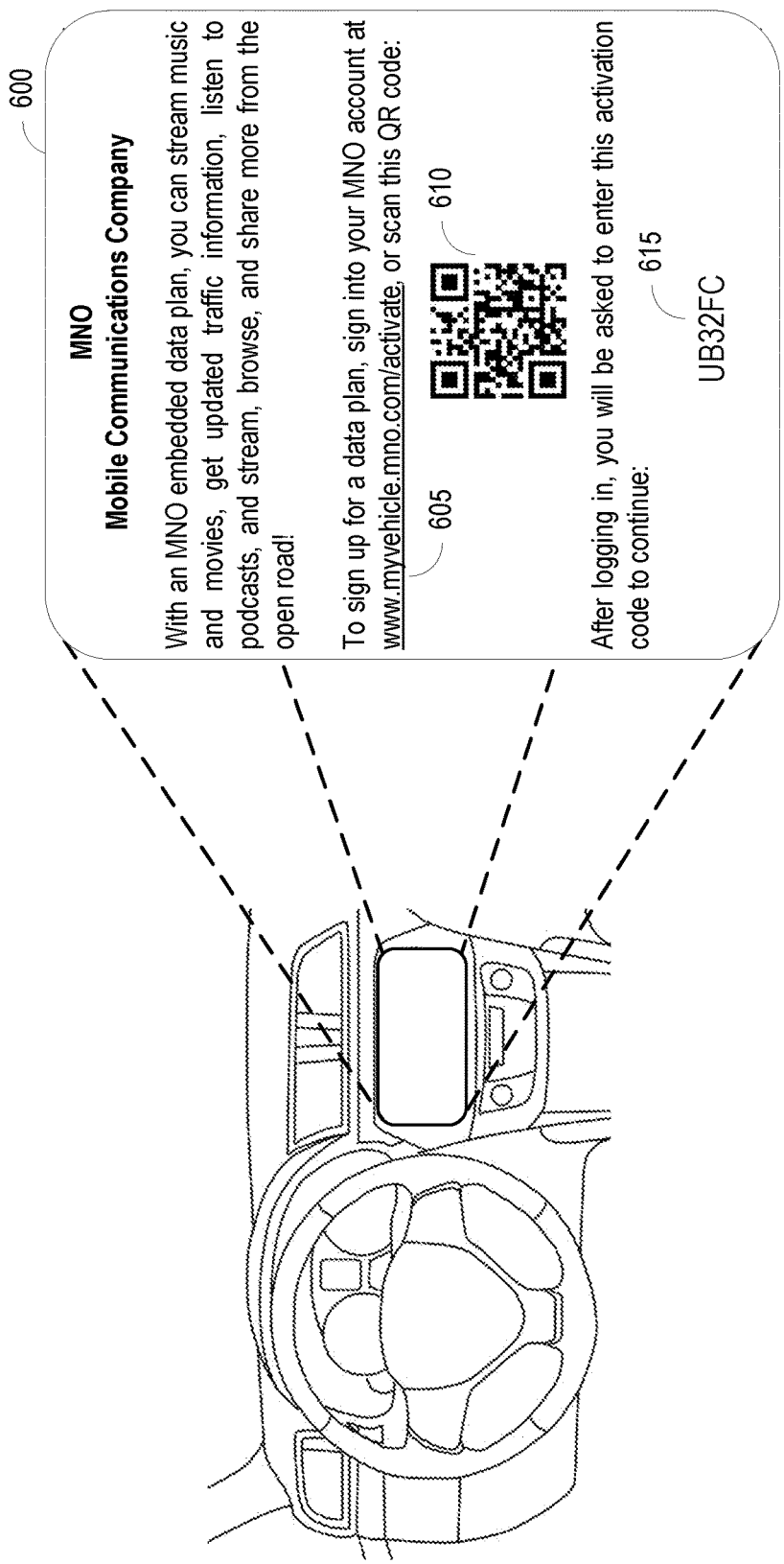
FIG. 6 illustrates a pre-login graphical user interface (GUI) displaying a link and a vehicle activation code, in accordance with various aspects and example embodiments of the subject disclosure.

FIG. 6 describes a pre-login GUI 600 that prompts users to log in to their user account, in accordance with example embodiments of the present application. On initial setup of the in-vehicle UE (e.g., in-vehicle UE 205), the in-vehicle UE can generate, e.g., on a display associated with the in-vehicle UE, with one or more screens (e.g., pre-login GUI 600) that can prompt the user to log in to his or her user account. The pre-login GUI 600 can display text informing the user the benefits of having a service plan. The pre-login GUI 600 can display a hyperlink in-vehicle UE can be operable to display a link that enables a user, using the mobile device, to request a login page (see, e.g., FIG. 7 below). The login page is associated with an activation of an in-vehicle user equipment, wherein the activation results in a pairing of the in-vehicle user equipment with the user account. The link can comprise, for example, a URL 605 (e.g., www.myvehicle.mno.com/activate). The link can also comprise a QR code 610 for a user to scan with his or her mobile device (e.g., the mobile device can have a QR code scanner application). Additionally, the in-vehicle UE can display an activation code 615 associated with the in-vehicle UE. To pair the in-vehicle UE and the user account, the user can visit the activation page based on the URL 605, or just scan the QR code 610 with a QR code scanner application. Either can take the user the appropriate screens to log in to their user account (or on the login page, create a user account if one does not exist).

FIG. 7 illustrates an account login GUI 700, in accordance with example embodiments of the present application. The account login GUI 700 can be displayed by the mobile device (e.g., UE 215) in response to the entry of URL 605, or upon scan of QR code 610. The account login GUI 700, which in example embodiments can be comprise a webpage served up by the user account administration server (e.g., user account administration server 210), can present prompts to solicit entry of access credentials related to the user account associated with the user identity. If the user identity does not have an account, the user identity can select, for example, a "create account" hyperlink from the account login GUI 700 that takes the user to an account creation page presented by the mobile device, where the user can enter in and submit information to create a user account.

FIG. 8 illustrates an activation code entry GUI 800, in accordance with example embodiments of the present application. Based on the receipt of valid access credentials from the mobile device (e.g., UE 215), the user account administration server (e.g., user account administration server 210) can facilitate display of activation code entry GUI 800 via the mobile device for entry of an activation code. In example embodiments, the activation code entry GUI 800, which can comprise a webpage served up by the user account administration server, can comprise a prompt field 810 that seeks entry of the activation code 615 that was displayed by the in-vehicle user equipment (e.g., displayed in the pre-login GUI 600). After entry of alphanumeric numbers, for example, into the prompt field 810, the mobile device can transmit the submitted code to the user account administration server.

FIG. 9 shows a confirmation GUI 900 in which a user can confirm allowance of the in-vehicle UE (in-vehicle UE 205) to access the user account for usage, data, and other account features, in accordance with example embodiments of the present application. The confirmation GUI 900 which in example embodiments can be comprise a webpage served up by the user account administration server (e.g., user account administration server 210), can be presented after a determination that the submitted code into prompt field 810 is valid (e.g., matches the activation code 615 presented by the in-vehicle UE as shown in FIG. 6), and after the user account administration server (user account administration server 210) facilitates pairing of the in-vehicle UE with the user account.

FIG. 10 shows a plan selection GUI 1000 that presents mobile communications and infotainment plans by the in-vehicle UE (e.g., in-vehicle UE 205) to users after the user account has been paired to the in-vehicle UE platform, in accordance with example embodiments of the present application. In example embodiments, plans of different tiers can be presented, and a free trial could be started at a specific tier. The plans can be post-paid plans, but can also be pre-paid plans. As such, subsequent to the pairing, the user account administration server (e.g., user account administration server 210) can facilitate presenting a plan via the in-vehicle UE for selection of communication option for delivery of the mobile communications to the in-vehicle user equipment, and facilitate association of the in-vehicle user equipment with entertainment related services deliverable by a content server (e.g., content application server 230). The user account administration server can send the information regarding each plan to the in-vehicle UE for display in the plan selection GUI 1000. Alternatively, the in-vehicle UE can also contain the plan information in a local memory accessible by the in-vehicle UE. When plan terms and prices are updated, the user account administration server (or some other server) can transmit the updated plan information to the in-vehicle UE for display.

In example embodiments, a server device (e.g., user account administration server 210), comprising a processor and a memory that stores executable instructions that, when executed by the processor, facilitate performance of operations, including those operations/methods as described above, and also below in FIGS. 11-13. In each of these operations, steps or aspects described in one operation can be substituted or combined with steps and aspects with respect to the other operations, as well as features described, unless context warrants that such combinations or substitutions are not possible. Further, if a feature, step, or aspect is not described with respect to example operations, this does not mean that said feature, step, or aspect is incompatible or impossible with respect to those operations. As such, the example operations of the present application described above and below are not necessarily limited to the steps, features, or aspects that are described with respect to those example operations.

Figure 11:
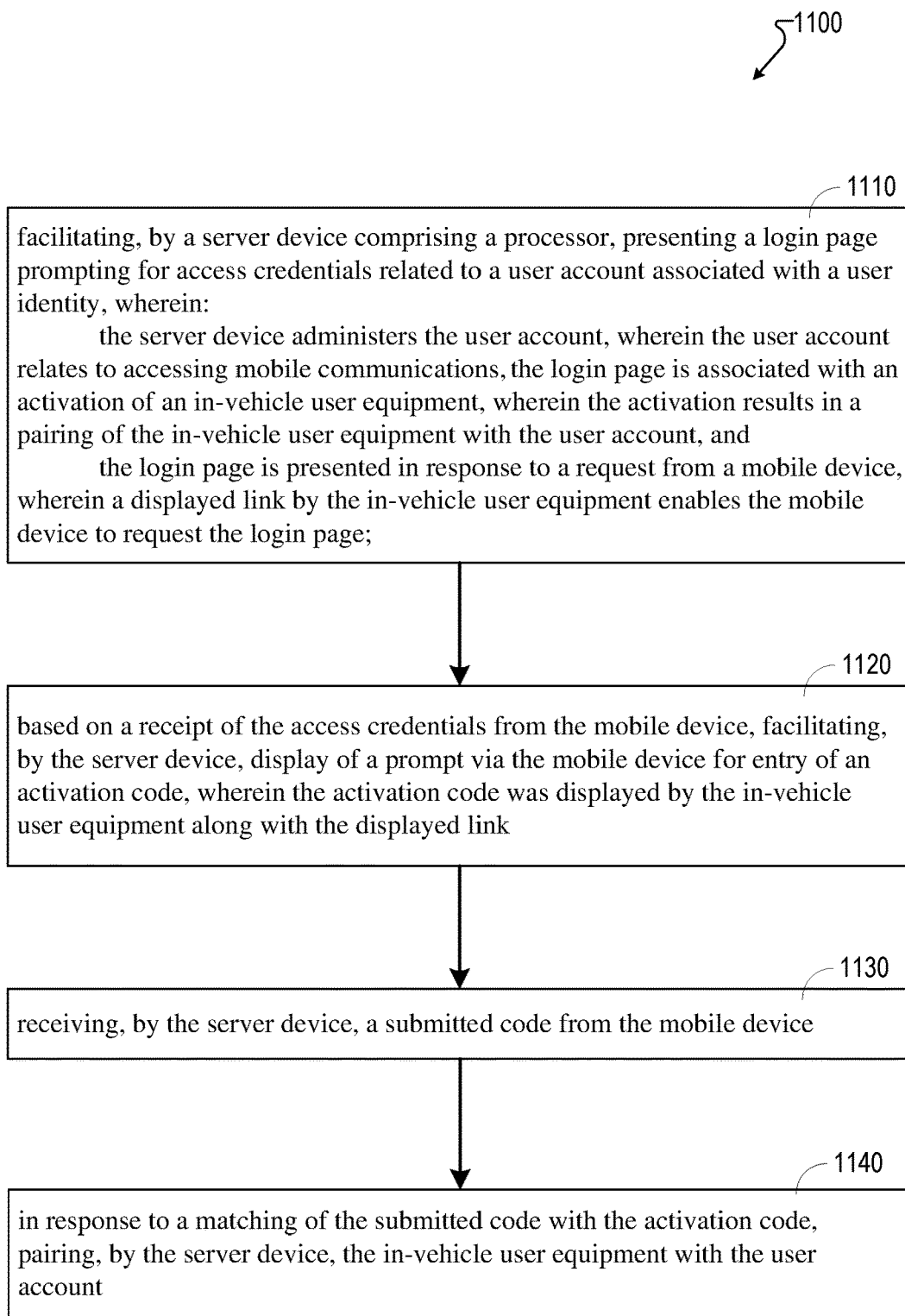
FIG. 11 illustrates an example of operations that can be performed by a user account administration server (e.g., user account administration server device), in accordance with various aspects and example embodiments of the present application.
Figure 13:
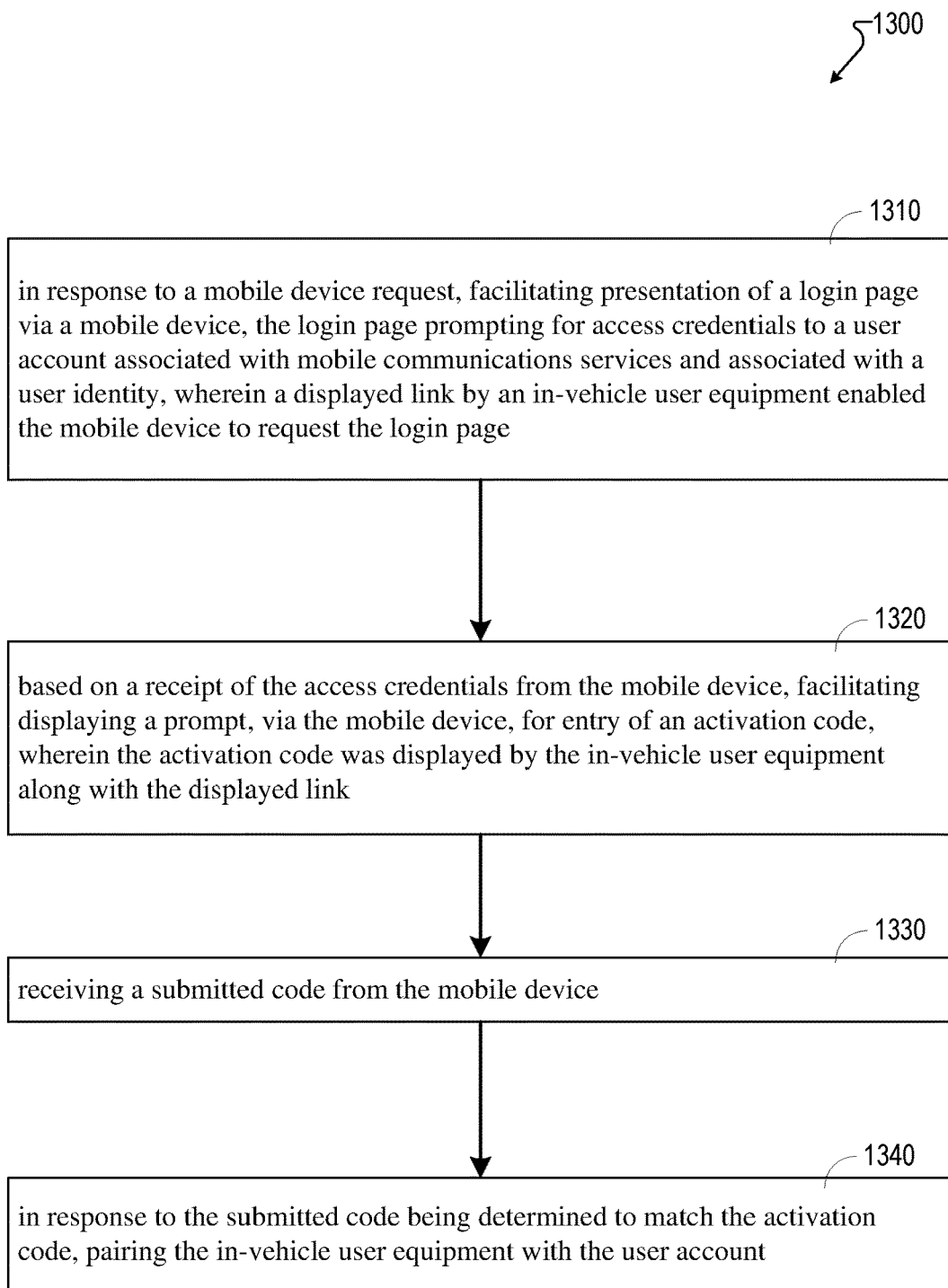
FIG. 13 illustrates yet another example of operations that can be performed by the user account administration server, in accordance with various aspects and example embodiments of the present application.

FIG. 11 illustrates a flow diagram of example operations 1100 that can be performed, for example, by a server device (e.g., user account administration server 210) comprising a processor and a memory (e.g., a machine-readable storage medium) that stores executable instructions (e.g., software) that, when executed by the processor, facilitate performance of the operations described in FIG. 13.

The example operations 1100 can comprise, at block 1110, facilitating presenting a login page (e.g., account login GUI 700) prompting for access credentials related to a user account associated with a user identity. The server device administers the user account, wherein the user account relates to accessing mobile communications. The mobile communications can be transmitted in accordance with a vehicle-to-everything standard related to the delivery of wireless communications to motor vehicles. The login page is associated with an activation of an in-vehicle user equipment (e.g., in-vehicle UE 205), wherein the activation results in a pairing of the in-vehicle user equipment with the user account. The login page is presented in response to a request from a mobile device (e.g., UE 215), wherein a displayed link (e.g., URL 605, QR code 610) by the in-vehicle user equipment enables the mobile device to request the login page.

The example operations 1100 can further comprise, at block 1120, based on a receipt of the access credentials from the mobile device, facilitating display of a prompt via the mobile device for entry of an activation code, wherein the activation code (e.g., activation code 615) was displayed by the in-vehicle user equipment along with the displayed link. The prompt can be displayed via, for example, activation code entry GUI 800.

At block 1130, the example operations 1100 can further comprise receiving a submitted code from the mobile device (e.g., submitted code entered using the activation code entry GUI 800).

At block 1140, the example operations 1100 can further comprise, in response to a matching of the submitted code with the activation code, pairing the in-vehicle user equipment with the user account. In example embodiments, the matching can be performed by the user account administration server, or by the in-vehicle user equipment.

The example operations 1100 can further comprise, prior to the pairing the in-vehicle user equipment with the user account, facilitating prompting for a confirmation to allow the in-vehicle user equipment to access the user account (e.g., via a confirmation GUI 900).

The example operations 1100 can further comprise, subsequent to the pairing, facilitating presenting a plan (e.g., service plan, as shown in FIG. 10) via the in-vehicle user equipment for selection of a communication option for delivery of the mobile communications to the in-vehicle user equipment.

The example operations 1100 can further comprise, subsequent to the pairing, facilitating association of the in-vehicle user equipment with entertainment related services deliverable by a content server (e.g., content application server 230).

The example operations 1100 can further comprise, receiving vehicle identification data from the in-vehicle user equipment, wherein the vehicle identification data comprises a make and a model of a vehicle in which the in-vehicle user equipment is located (e.g., situated, embedded, resides, etc.). The type can be determined based on the make and the model of the vehicle.

The example operations 1100 can further comprise, facilitating transmission of the vehicle identification data to the content server, wherein the content server facilitates delivery of selectable images to be displayed via a screen of the in-vehicle user equipment, wherein the selectable images represent content selected by the content server based on the type of the vehicle, and wherein the content is streamable to the in-vehicle user equipment via the mobile communications. The type can be, for example, a mini-van, and the content can comprise content that is rated by a motion picture association for viewing by a general audience (e.g., rated G).

The example operations 1100 can further comprise, as a result of selections of the selectable images, facilitating, by the server device, storage of preference data related to the selections, wherein the preference data is associated with the user account. The content server, based on the preference data, can facilitate presentment, for display via the screen of the in-vehicle user equipment, of subsequent selectable images related to targeted content determined after analysis of the preference data. In example embodiments, the content server can receive global positioning system data (e.g., from the in-vehicle user equipment comprising a GPS device) indicating that a trip duration, wherein the trip duration is based upon a starting point and a destination point entered into the global positioning system device. Based on the duration, the content server can deliver the selectable images, which can relate to content that has a run-time within the duration. In example embodiments, the content server can receive global positioning system data indicating a destination of the vehicle. The content server can deliver selectable images related to content selected based on the destination.

Figure 12:
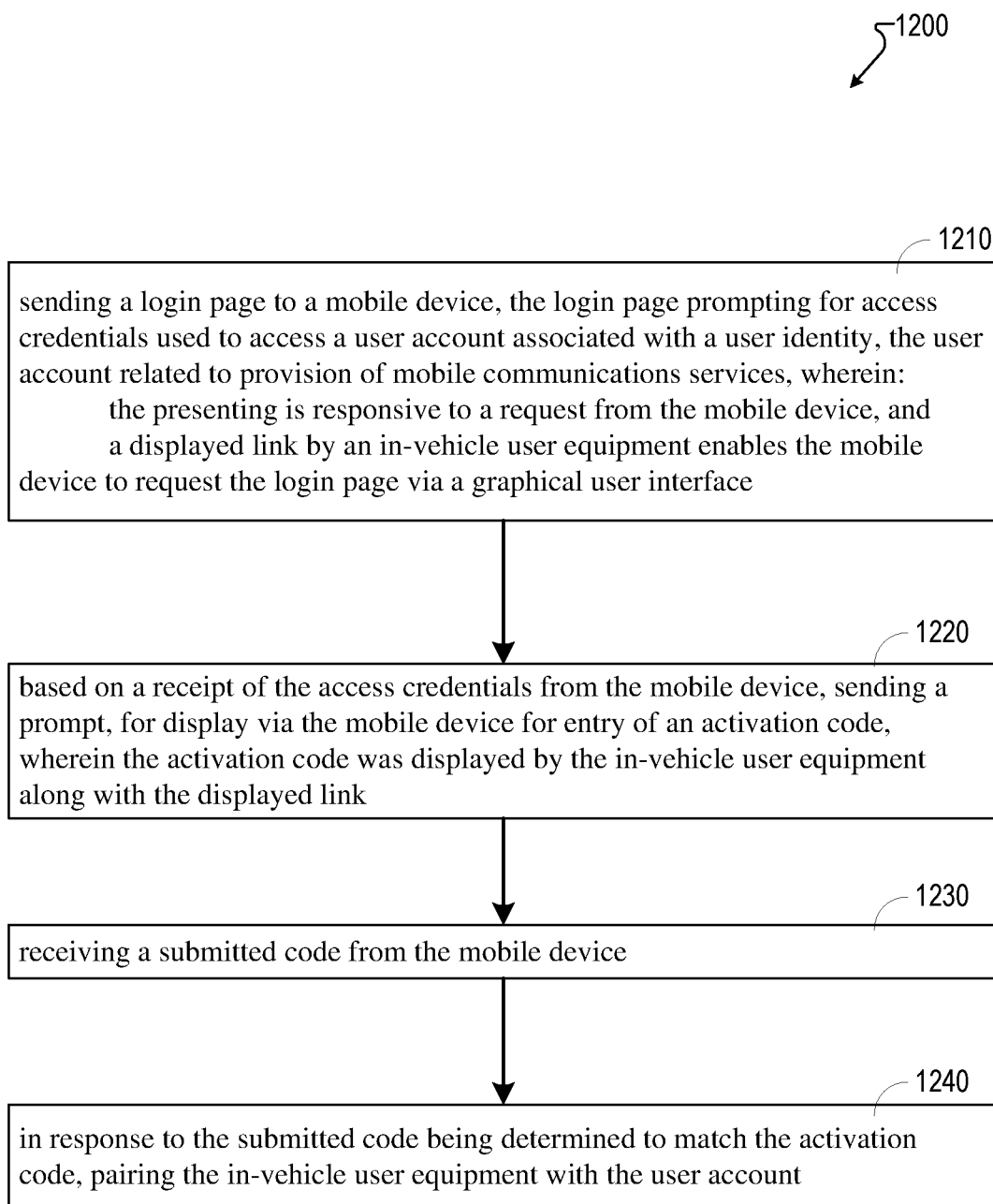
FIG. 12 illustrates another example of operations that can be performed the user account administration server, in accordance with various aspects and example embodiments of the present application.

FIG. 12 illustrates a flow diagram of example operations 1200 that can be performed, for example, by a server device (e.g., user account administration server 210) comprising a processor and a memory (e.g., a machine-readable storage medium) that stores executable instructions (e.g., software) that, when executed by the processor, facilitate performance of the operations described in FIG. 12.

The example operations 1200, at block 1210, can comprise, sending a login page (e.g., account login GUI 700) to a mobile device (e.g., UE 215), the login page prompting for access credentials used to access a user account associated with a user identity, the user account related to provision of mobile communications services. The mobile communications can be transmitted in accordance with a vehicle-to-everything standard related to the delivery of wireless communications to motor vehicles. The sending is responsive to a request from the mobile device, and a displayed link (e.g., URL 605, QR code 610) by an in-vehicle user equipment (e.g., in-vehicle UE 205) enables the mobile device to request the login page via a graphical user interface (e.g., web browser of the mobile device).

The example operations 1200, at block 1220, can further comprise, based on a receipt of the access credentials from the mobile device, sending a prompt, for display via the mobile device for entry of an activation code, wherein the activation code (e.g., activation code 615) was displayed by the in-vehicle user equipment along with the displayed link (e.g., as shown in FIG. 6).

The example operations 1200, at block 1230, can further comprise, receiving a submitted code from the mobile device (e.g., submitted code entered using the activation code entry GUI 800).

At block 1240, the example operations 1200 can comprise, in response to the submitted code being determined to match the activation code, pairing the in-vehicle user equipment with the user account. In example embodiments, the determination of the match can be performed by the user account administration server, or by the in-vehicle user equipment.

The example operations 1200 can further comprise, prior to the pairing the in-vehicle user equipment with the user account, facilitating prompting for a confirmation to allow the in-vehicle user equipment to access the user account (e.g., via a confirmation GUI 900).

The example operations 1200 can further comprise, subsequent to the pairing, facilitating presenting a plan (e.g., service plan, as shown in FIG. 10) via the in-vehicle user equipment for selection of a communication option for delivery of the mobile communications to the in-vehicle user equipment.

The example operations 1200 can further comprise, subsequent to the pairing, facilitating association of the in-vehicle user equipment with entertainment related services deliverable by a content server (e.g., content application server 230).

The example operations 1200 can further comprise, receiving vehicle identification data from the in-vehicle user equipment, wherein the vehicle identification data comprises a make and a model of a vehicle in which the in-vehicle user equipment is located (e.g., situated, embedded, resides, etc.). The type can be determined based on the make and the model of the vehicle.

The example operations 1200 can further comprise, facilitating transmission of the vehicle identification data to the content server, wherein the content server facilitates delivery of selectable images to be displayed via a screen of the in-vehicle user equipment, wherein the selectable images represent content selected by the content server based on the type of the vehicle, and wherein the content is streamable to the in-vehicle user equipment via the mobile communications. The type can be, for example, a mini-van, and the content can comprise content that is rated by a motion picture association for viewing by a general audience (e.g., rated G).

The example operations 1200 can further comprise, as a result of selections of the selectable images, facilitating, by the server device, storage of preference data related to the selections, wherein the preference data is associated with the user account. The content server, based on the preference data, can facilitate presentment, for display via the screen of the in-vehicle user equipment, of subsequent selectable images related to targeted content determined after analysis of the preference data. In example embodiments, the content server can receive global positioning system data (e.g., from the in-vehicle user equipment comprising a GPS device) indicating that a trip duration, wherein the trip duration is based upon a starting point and a destination point entered into the global positioning system device. Based on the duration, the content server can deliver the selectable images, which can relate to content that has a run-time within the duration. In example embodiments, the content server can receive global positioning system data indicating a destination of the vehicle. The content server can deliver selectable images related to content selected based on the destination.

FIG. 13 illustrates a flow diagram of example operations 1300 that can be performed, for example, by a server device (e.g., user account administration server 210) comprising a processor and a memory (e.g., a machine-readable storage medium) that stores executable instructions (e.g., software) that, when executed by the processor, facilitate performance of the operations described in FIG. 13.

The example operations 1300 can at block 1310 comprise, in response to a mobile device request, facilitating presentation of a login page (e.g., account login GUI 700) via a mobile device (UE 215). The login page can prompt for access credentials to a user account associated with mobile communications services and associated with a user identity. The mobile communications services can be provided in accordance with a vehicle-to-everything standard related to the delivery of wireless communications to motor vehicles. A displayed link (e.g., URL 605, QR code 610) by an in-vehicle user equipment can enable the mobile device to request the login page.

At block 1320, the example operations 1300 can further comprise, based on a receipt of the access credentials from the mobile device, facilitating displaying a prompt, via the mobile device, for entry of an activation code, wherein the activation code (e.g., activation code 615) was displayed by the in-vehicle user equipment along with the displayed link (e.g., as shown in FIG. 6).

At block 1330, the example operations 1300 can further comprise, receiving a submitted code from the mobile device (e.g., submitted code entered using the activation code entry GUI 800).

At block 1340, the example operations 1300 can further comprise, in response to the submitted code being determined to match the activation code, pairing the in-vehicle user equipment with the user account. In example embodiments, the determination of the match can be performed by the user account administration server, or by the in-vehicle user equipment.

The example operations 1300 can further comprise, prior to the pairing the in-vehicle user equipment with the user account, facilitating prompting for a confirmation to allow the in-vehicle user equipment to access the user account (e.g., via a confirmation GUI 900).

The example operations 1300 can further comprise, subsequent to the pairing, facilitating presenting a plan (e.g., service plan, as shown in FIG. 10) via the in-vehicle user equipment for selection of a communication option for delivery of the mobile communications to the in-vehicle user equipment.

The example operations 1300 can further comprise, subsequent to the pairing, facilitating association of the in-vehicle user equipment with entertainment related services deliverable by a content server (e.g., content application server 230).

The example operations 1300 can further comprise, receiving vehicle identification data from the in-vehicle user equipment, wherein the vehicle identification data comprises a make and a model of a vehicle in which the in-vehicle user equipment is located (e.g., situated, embedded, resides, etc.). The type can be determined based on the make and the model of the vehicle.

The example operations 1300 can further comprise, facilitating transmission of the vehicle identification data to the content server, wherein the content server facilitates delivery of selectable images to be displayed via a screen of the in-vehicle user equipment, wherein the selectable images represent content selected by the content server based on the type of the vehicle, and wherein the content is streamable to the in-vehicle user equipment via the mobile communications. The type can be, for example, a mini-van, and the content can comprise content that is rated by a motion picture association for viewing by a general audience (e.g., rated G).

The example operations 1300 can further comprise, as a result of selections of the selectable images, facilitating, by the server device, storage of preference data related to the selections, wherein the preference data is associated with the user account. The content server, based on the preference data, can facilitate presentment, for display via the screen of the in-vehicle user equipment, of subsequent selectable images related to targeted content determined after analysis of the preference data. In example embodiments, the content server can receive global positioning system data (e.g., from the in-vehicle user equipment comprising a GPS device) indicating that a trip duration, wherein the trip duration is based upon a starting point and a destination point entered into the global positioning system device. Based on the duration, the content server can deliver the selectable images, which can relate to content that has a run-time within the duration. In example embodiments, the content server can receive global positioning system data indicating a destination of the vehicle. The content server can deliver selectable images related to content selected based on the destination.

Referring now to FIG. 14, illustrated is a schematic block diagram of a mobile device 1400 (e.g., UE 215) capable of connecting to a network in accordance with example embodiments described herein. Although a mobile device 1400 is illustrated herein, it will be understood that the mobile device can be other devices as well, and that the mobile device 1400 is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The mobile device 1400 includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the mobile device 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a global GSM transceiver) and/or an unlicensed transceiver 1413 (e.g., Wi-Fi, WiMax) for corresponding signal communications. The mobile device 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The mobile device 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1394) through a hardwire connection, and other serial input devices (e.g., a keyboard, keypad, and mouse). This supports updating and troubleshooting the mobile device 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The mobile device 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the mobile device 1400, and updated by downloading data and software.

The mobile device 1400 can process IP data traffic through the communications component 1410 to accommodate IP traffic from an IP network such as, for example, the Internet, a corporate intranet, a home network, a person area network, etc., through an ISP or broadband cable provider. Thus, VoIP traffic can be utilized by the mobile device 1400 and IP-based multimedia content can be received in either an encoded or decoded format.

A video processing component 1422 (e.g., a camera) can be provided for decoding encoded multimedia content. The video processing component 1422 can aid in facilitating the generation, editing and sharing of video quotes. The mobile device 1400 also includes a power source 1424 in the form of batteries and/or an AC power subsystem, which power source 1424 can interface to an external power system or charging equipment (not shown) by a power I/O component 1426.

The mobile device 1400 can also include a video component 1430 for processing video content received and, for recording and transmitting video content. For example, the video component 1430 can facilitate the generation, editing and sharing of video quotes. A location tracking component 1432 facilitates geographically locating the mobile device 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1438 when the Wi-Fi transceiver 1413 detects the beacon of the access point. A SIP client 1440 enables the mobile device 1400 to support SIP protocols and register the subscriber with the SIP registrar server. The applications 1406 can also include a client 1442 that provides at least the capability of discovery, play and store of multimedia content, for example, music.

The mobile device 1400, as indicated above related to the communications component 1410, includes an indoor network radio transceiver 1413 (e.g., Wi-Fi transceiver 1413). This function supports the indoor radio link, such as IEEE 802.11, for the mobile device 1400. The mobile device 1400 can accommodate at least satellite radio services through a mobile device that can combine wireless voice and digital radio chipsets into a single handheld device.

Figure 15:
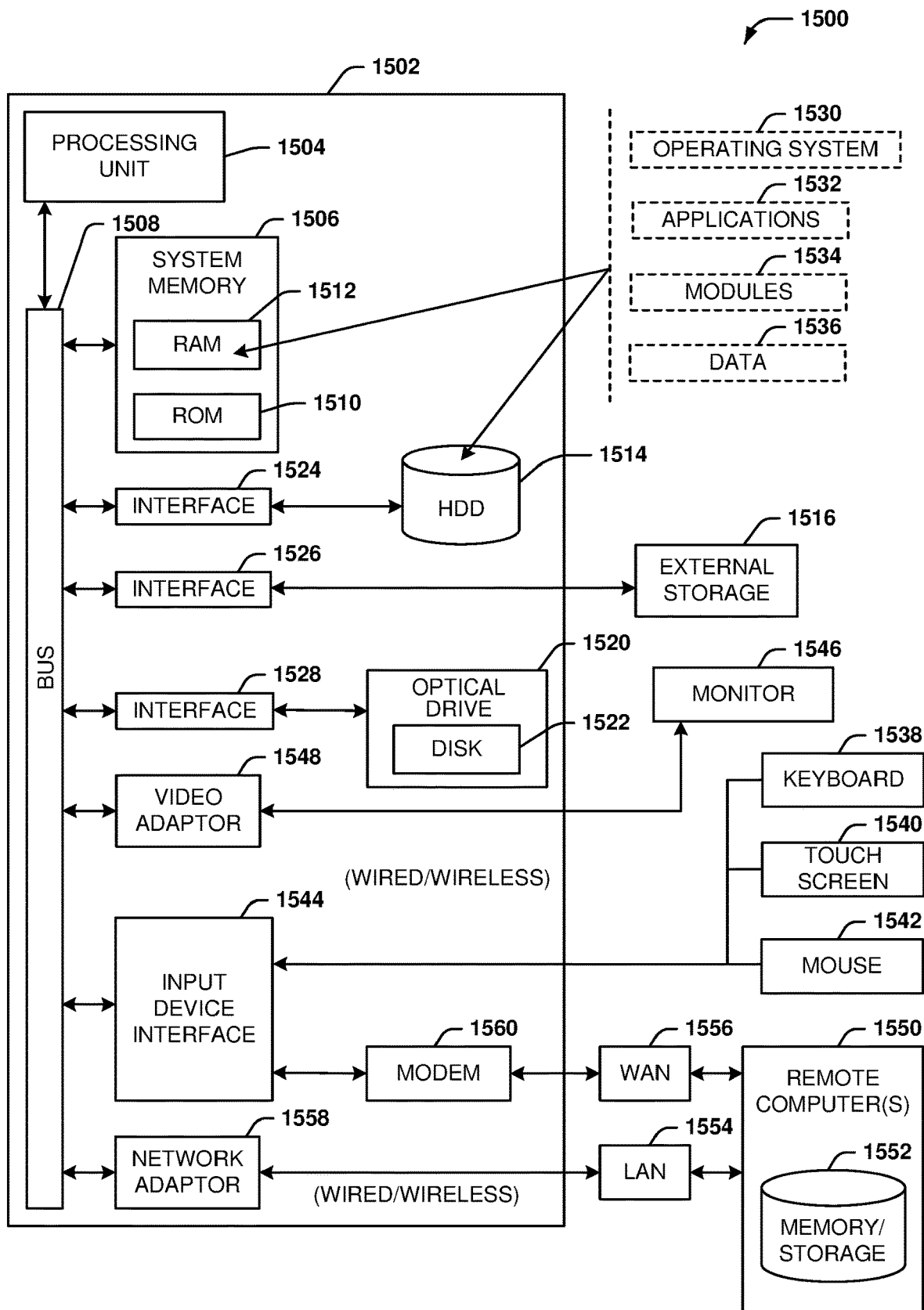
FIG. 15 illustrates an example block diagram of a computer that can execute processes and methods, in accordance with various aspects and embodiments of the present application.

In order to provide additional context for various embodiments described herein, FIG. 15 and the following discussion are intended to provide a brief, general description of a suitable computing environment 1500 in which the various embodiments described herein can be implemented. For example, one or more of the network devices shown in FIG. 2 (e.g., user account administration server 210, content application server 230) can have similar components to that of the computer described in FIG. 15.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

The term "facilitate" as used herein is in the context of a system, device or component "facilitating" one or more actions, methods, or example operations, in respect of the nature of complex computing environments in which multiple components and/or multiple devices can be involved in some computing operations. Non-limiting examples of actions that may or may not involve multiple components and/or multiple devices comprise the methods described herein, including but not limited to transmitting or receiving data, establishing a connection between devices, determining intermediate results toward obtaining a result, etc. In this regard, a computing device or component can facilitate an operation by playing any part in accomplishing the operation (e.g., directing, controlling, enabling, etc.). When operations of a component are described herein, it is thus to be understood that where the operations are described as facilitated by the component, the operations can be optionally completed with the cooperation of one or more other computing devices or components, such as, but not limited to, processors, application specific integrated circuits (ASICs), sensors, antennae, audio and/or visual output devices, other devices, etc.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infra-red and other wireless media.

Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the present application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the present application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure.

For example, disclosed systems and apparatuses and components or subsets thereof (referred to hereinafter as components) should neither be presumed to be exclusive of other disclosed systems and apparatuses, nor should an apparatus be presumed to be exclusive to its depicted components in an example embodiment or embodiments of this disclosure, unless where clear from context to the contrary. Additionally, steps or blocks as shown in example methods, or operations, can be interchangeable with steps or blocks as show in other example methods/operations. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of components (or embodiments) into a single component achieving aggregate functionality, where suitable, or distribution of functionality of a single system or component into multiple systems or components, where suitable. In addition, incorporation, combination or modification of systems or components depicted herein or modified as stated above with systems, apparatuses, components or subsets thereof not explicitly depicted herein but known in the art or made evident to one with ordinary skill in the art through the context disclosed herein are also considered within the scope of the present disclosure.

Therefore, the disclosed subject matter should not be limited to any single embodiment described herein, but rather should be construed in breadth and scope in accordance with the claims below.

What is claimed is:

1. A method, comprising:
    receiving, by server equipment comprising a processor, a request from network equipment requesting use of an in-vehicle user equipment in a vehicle;
    based on the request, identifying, by the server equipment, a user account associated with the network equipment;
    based on a model of the vehicle, determining, by the server equipment, that a minor is a likely consumer of content via the in-vehicle user equipment, wherein determining that the minor is a likely consumer comprises determining that the model of the vehicle is of a class of vehicles associated with transporting minors;
    based on the determining that the minor is the likely consumer, selecting, by the server equipment, content with a content rating commensurate with viewing by minors; and
    based on the user account, facilitating, by the server equipment, delivery of the content to the in-vehicle user equipment.

2. The method of claim 1, wherein the request comprises credential information for the user account.

3. The method of claim 2, wherein selecting the content for communication to the in-vehicle user equipment is further based on a preference associated with the user account.

4. The method of claim 1, further comprising, based on the user account, communicating, by the server equipment activation information to the in-vehicle user equipment enabling the in-vehicle user equipment to display the content.

5. The method of claim 1, wherein the in-vehicle user equipment comprises presentation equipment for presentation of content information received from a content-serving device.

6. The method of claim 1, wherein communication of information to the in-vehicle user equipment is facilitated by a vehicle-to-everything protocol related to delivery of wireless communications to motor vehicles.

7. The method of claim 1, further comprising, based on the user account, receiving, by the server equipment, vehicle identification information for the vehicle from the in-vehicle user equipment.

8. The method of claim 7, wherein the vehicle identification information comprises the model of the vehicle.

9. The method of claim 1, further comprising, based on the user account, facilitating, by the server equipment, control of the in-vehicle user equipment by the network equipment.

10. Vehicle equipment of a vehicle, comprising:
    a processor; and
    a memory that stores executable instructions that, when executed by the processor, facilitate performance of operations, comprising:

receiving activation information associated with user equipment from server equipment, wherein the activation information is based on a request received by the server equipment from the user equipment;

based on the activation information, communicating vehicle information of the vehicle to the server equipment;

based on the vehicle information, receiving from the server equipment, content for display, wherein the content was selected by the server equipment based on a determination that a minor is a likely consumer of the content, wherein the determination was based the vehicle information indicating that the vehicle is of a class of vehicles associated with transporting minors.

11. The vehicle equipment of claim 10, wherein the activation information links the vehicle equipment to the user equipment.

12. The vehicle equipment of claim 10, wherein the activation information is further based on a user account linked to the user equipment.

13. The vehicle equipment of claim 12, wherein receiving the content is further based on the user account.

14. The vehicle equipment of claim 13, wherein receiving the content is further based on a preference of the user account applicable to setting preferences associated with the user account for operation of the vehicle device.

15. The vehicle equipment of claim 10, wherein receiving the content is facilitated by a vehicle-to-everything wireless communication protocol applicable to communications with the vehicle.

16. The vehicle equipment of claim 10, wherein the content comprises first content, and wherein the operations further comprise:

based on the vehicle identification information, receiving second content associated with the vehicle.

17. The vehicle device of claim 10, wherein the operations further comprise, based on the activation information, executing an operation based on a command received from the user equipment.

18. A non-transitory machine-readable medium comprising executable instructions that, when executed by a processor of a content delivery server, facilitate performance of operations, comprising:

receiving, from a mobile device, activation information associated with a content delivery device of a vehicle;

based on the activation information, linking the mobile device with the content delivery device;

based on a model of the vehicle, determining that a minor is a likely consumer of content via the content delivery device, wherein determining that the minor is a likely consumer comprises determining that the model of the vehicle is of a class of vehicles associated with transporting minors;

based on the determining that the minor is the likely consumer, selecting content with a content rating commensurate with viewing by minors; and based on the activation information, facilitating delivery of the content to the content delivery device.

19. The non-transitory machine-readable medium of claim 18, wherein the content delivery device is installed in the vehicle.

20. The non-transitory machine-readable medium of claim 18, wherein the operations further comprise, based on the activation information, pairing the content delivery device with a user account associated with the mobile device.

* * * * *